(12) United States Patent
Gasti et al.

(10) Patent No.: US 11,936,775 B2
(45) Date of Patent: Mar. 19, 2024

(54) AUTHENTICATION PROCESSING SERVICES FOR GENERATING HIGH-ENTROPY CRYPTOGRAPHIC KEYS

(71) Applicant: KEYLESS TECHNOLOGIES SRL, Rome (IT)

(72) Inventors: Paolo Gasti, New York, NY (US); Paul Galwas, St. Ives (GB); Andrea Carmignani, Rome (IT); Jaroslav Šedĕnka, Hranice (CZ)

(73) Assignee: KEYLESS TECHNOLOGIES SRL, Rome (IT)

( * ) Notice: Subject to any disclaimer, the term of this patent is extended or adjusted under 35 U.S.C. 154(b) by 155 days.

(21) Appl. No.: 17/840,969

(22) Filed: Jun. 15, 2022

(65) Prior Publication Data
US 2023/0048912 A1    Feb. 16, 2023

Related U.S. Application Data

(60) Provisional application No. 63/231,708, filed on Aug. 10, 2021.

(51) Int. Cl.
*H04L 9/08*  (2006.01)
*G06F 21/62*  (2013.01)
*H04L 9/14*  (2006.01)
*H04L 9/32*  (2006.01)

(52) U.S. Cl.
CPC ........ *H04L 9/0825* (2013.01); *G06F 21/6245* (2013.01); *H04L 9/0866* (2013.01); *H04L 9/14* (2013.01); *H04L 9/3271* (2013.01)

(58) Field of Classification Search
CPC ... H04L 9/3271; H04L 9/0825; H04L 9/0866; H04L 9/14; G06F 21/6245
See application file for complete search history.

(56) References Cited

U.S. PATENT DOCUMENTS

| | | |
|---|---|---|
| 2019/0215164 A1 | 7/2019 | Hamann et al. |
| 2019/0356491 A1 | 11/2019 | Herder, III et al. |
| 2020/0092269 A1 | 3/2020 | Le Saint et al. |
| 2021/0226797 A1* | 7/2021 | Choi ..................... H04L 9/3263 |
| 2021/0264010 A1* | 8/2021 | Smales ................. H04W 12/00 |
| 2021/0357915 A1* | 11/2021 | Makrides ........... G06Q 20/3674 |
| 2022/0012318 A1* | 1/2022 | Battle ................. H04L 63/0876 |
| 2022/0116231 A1* | 4/2022 | Choi ..................... B60L 53/30 |
| 2022/0307787 A1* | 9/2022 | Kloepfer ............ G07C 9/00563 |

OTHER PUBLICATIONS

Chaterjee U, Mukhopadhyay D, Chakraborty RS. 3PAA: A private PUF protocol for anonymous authentication. IEEE Transactions on Information Forensics and Security. Sep. 4, 2020 (Year: 2020).*
NPL Search Terms (Year: 2024).*
Bitcoin hierarchial deterministic wallets (retrieved on Jun. 11, 2019). https://github.com/bitcoin/bips/blob/master/bip-0032.mediawiki.
Xavier Boyen. Reusable cryptographic fuzzy extractors. pp. 82-91, 2004.

(Continued)

*Primary Examiner* — Syed A Zaidi
(74) *Attorney, Agent, or Firm* — VAN COURT & ALDRIDGE LLP

(57) ABSTRACT

Systems, methods, and computer-readable media for facilitating an authentication processing service are provided.

26 Claims, 13 Drawing Sheets

(56) References Cited

OTHER PUBLICATIONS

Julien Bringer, Herv'e Chabanne, and M'elanie Favre. Fuzzy vault for multiple users. pp. 67-81, 2012.

Jung Hee Cheon, Jinhyuck Jeong, Dongwoo Kim, and Jongchan Lee. A reusable fuzzy extractor with practical storage size: Modifying canetti et al.'s construction. pp. 28-44, 2018.

Andreas Erwig, Julia Hesse, Maximilian Orlt, and Siavash Riahi. Fuzzy asymmetric password-authenticated key exchange. Cryptology ePrint Archive, Report 2020/987, 2020. https://eprint.iacr.org/2020/987.

Michael J Freedman, Yuval Ishai, Benny Pinkas, and Omer Reingold. Keyword search and oblivious pseudorandom functions. In Theory of Cryptography Conference, pp. 303-324. Springer, 2005.

Blaise Gassend, Dwaine Clarke, Marten Van Dijk, and Srinivas Devadas. Silicon physical random functions. In Proceedings of the 9th ACM conference on Computer and communications security, pp. 148-160, 2002.

Oded Goldreich. Foundations of cryptography: vol. 2, basic applications. Cambridge university press, 2009.

Stanislaw Jarecki and Xiaomin Liu. Efficient oblivious pseudorandom function with applications to adaptive ot and secure computation of set intersection. In Theory of Cryptography Conference, pp. 577-594. Springer, 2009.

A. Juels and M. Sudan. A fuzzy vault scheme. Des. Codes Cryptography, 38(2), 2006.

A. Juels and M. Wattenberg. A fuzzy commitment scheme. In CCS, 1999.

David MRaihi, Salah Machani, Mingliang Pei, and Johan Rydell. Rfc 6238-totp: Time-based one-time password algorithm. Tools. ietf. org, 2011.

Phone Theft in America, (Accessed Sep. 2020). https://transition.fcc.gov/cgb/events/Lookout-phone-theft-in-america.pdf.

U. Uludag, S. Pankanti, and A. Jain. Fuzzy vault for fingerprints. In AVBPA, 2005.

Yunhua Wen and Shengli Liu. Reusable fuzzy extractor from LWE. pp. 13-27, 2018.

* cited by examiner

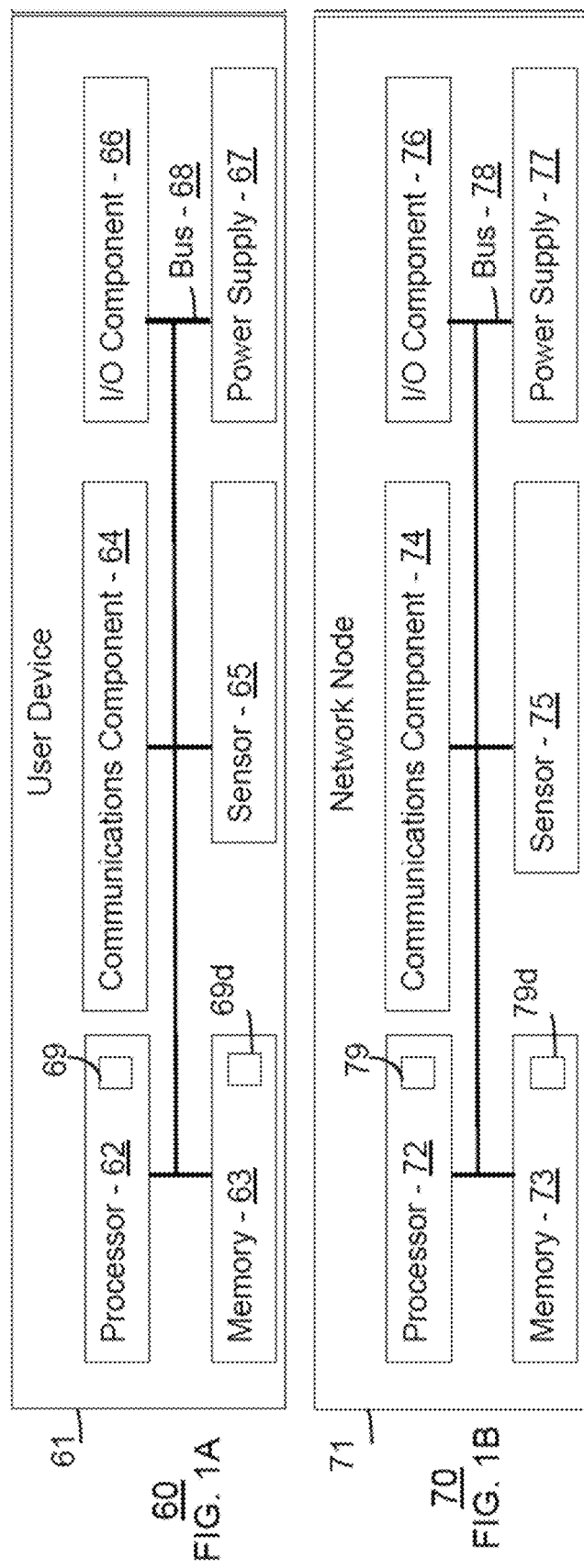

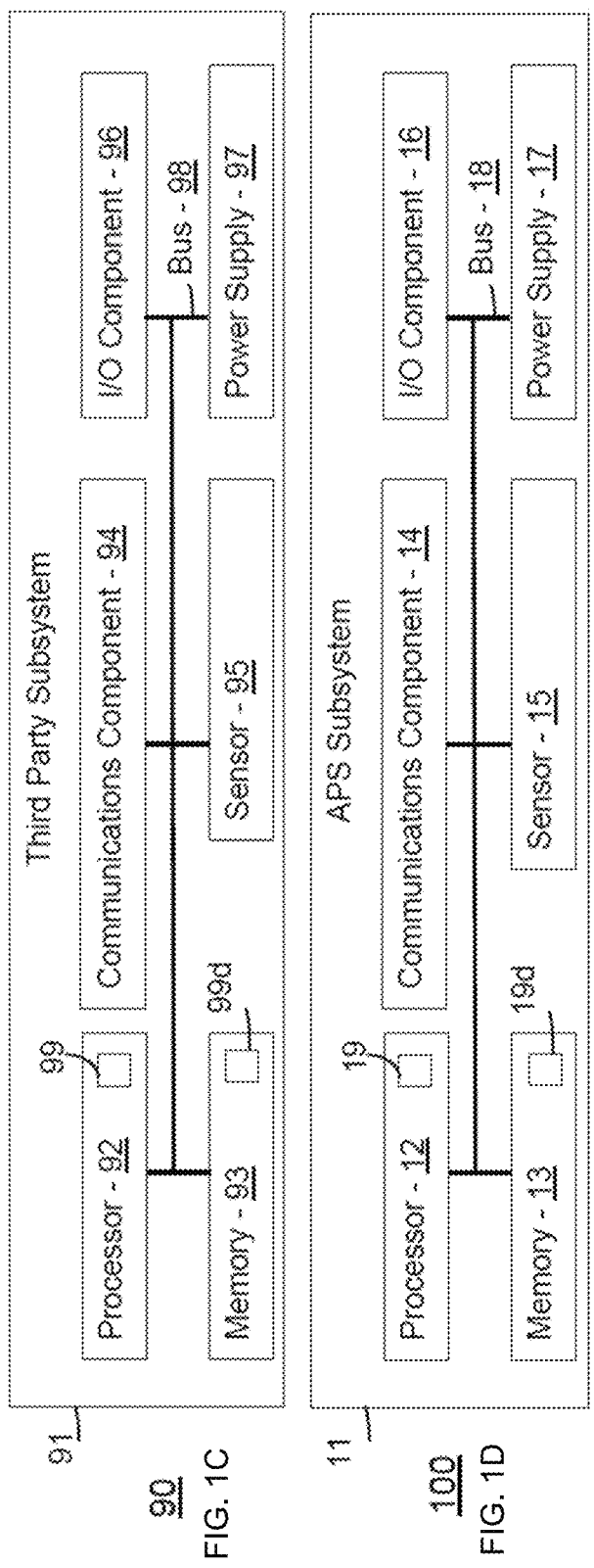

201

400

500

700

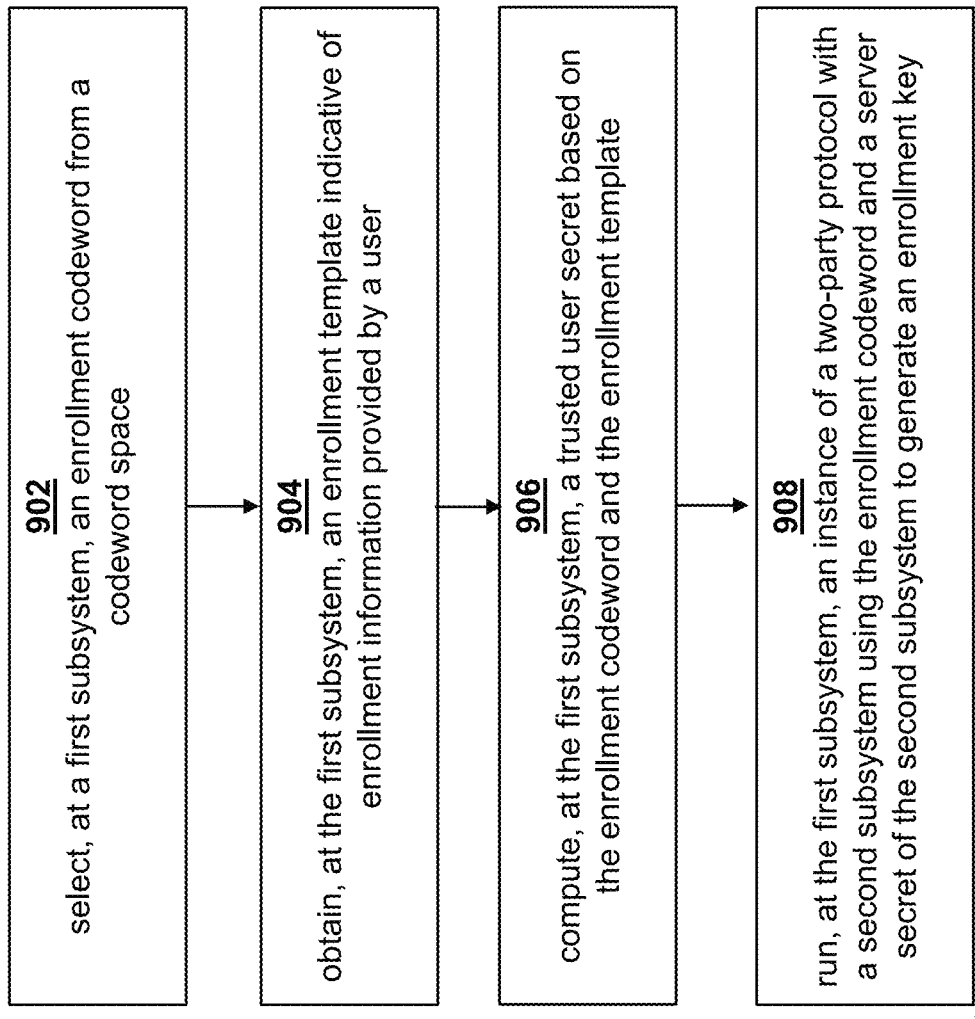

AUTHENTICATION PROCESSING SERVICES FOR GENERATING HIGH-ENTROPY CRYPTOGRAPHIC KEYS

CROSS-REFERENCE TO RELATED APPLICATION(S)

This application claims the benefit of prior filed U.S. Provisional Patent Application No. 63/231,708, filed Aug. 10, 2021, which is hereby incorporated by reference herein in its entirety.

COPYRIGHT NOTICE

At least a portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to an authentication processing service and, more particularly, to an authentication processing service for securely authenticating and consistently generating high-entropy cryptographic keys from noisy low min-entropy signals using a trusted device and one or more semi-trusted servers for enabling a secure operation.

BACKGROUND OF THE DISCLOSURE

Authenticating a key often requires generating a key from a particular signal that may be vulnerable to attack, thereby threatening the authentication process.

SUMMARY OF THE DISCLOSURE

This document describes systems, methods, and computer-readable media for providing an authentication processing service.

For example, a method for enrolling a user in a system including a first subsystem and a second subsystem storing a server secret is provided. The method may include selecting, at the first subsystem, an enrollment codeword from a codeword space, obtaining, at the first subsystem, an enrollment template indicative of enrollment information provided by the user, computing, at the first subsystem, a trusted user secret based on the enrollment codeword and the enrollment template, and running, at the first subsystem, an instance of a two-party protocol with the second subsystem using the enrollment codeword and the server secret to generate an enrollment key.

As yet another example, a non-transitory computer-readable storage medium storing at least one program is provided, the at least one program including instructions, which, when executed by at least one processor of an electronic subsystem, may cause the at least one processor to select an enrollment codeword from a codeword space, obtain an enrollment template indicative of enrollment information provided by a user, compute a trusted user secret based on the enrollment codeword and the enrollment template, and run an instance of a two-party protocol with a second subsystem using the enrollment codeword and a secret of the second subsystem to generate an enrollment key.

As yet another example, a user electronic device is provided that may include a memory component, a communications component, and a processor coupled to the memory component and the communications component, where the processor may be configured to select an enrollment codeword from a codeword space, obtain an enrollment template indicative of enrollment information provided by a user, compute a trusted user secret based on the enrollment codeword and the enrollment template, and run, via the communications component, an instance of a two-party protocol with a second subsystem using the enrollment codeword and a secret of the second subsystem to generate an enrollment key.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1A is a more detailed schematic view of a user device of the system of FIG. 1, according to at least some embodiments;

FIG. 1B is a more detailed schematic view of a network node of the system of FIG. 1, according to at least some embodiments;

FIG. 1C is a more detailed schematic view of a third party subsystem of the system of FIG. 1, according to at least some embodiments;

FIG. 1D is a more detailed schematic view of an authentication processing service subsystem of the system of FIG. 1, according to at least some embodiments;

FIG. 9 illustrates a flowchart of another exemplary process for enrolling a user with an APS platform, according to at least some embodiments.

DETAILED DESCRIPTION OF THE DISCLOSURE

Figure 1:
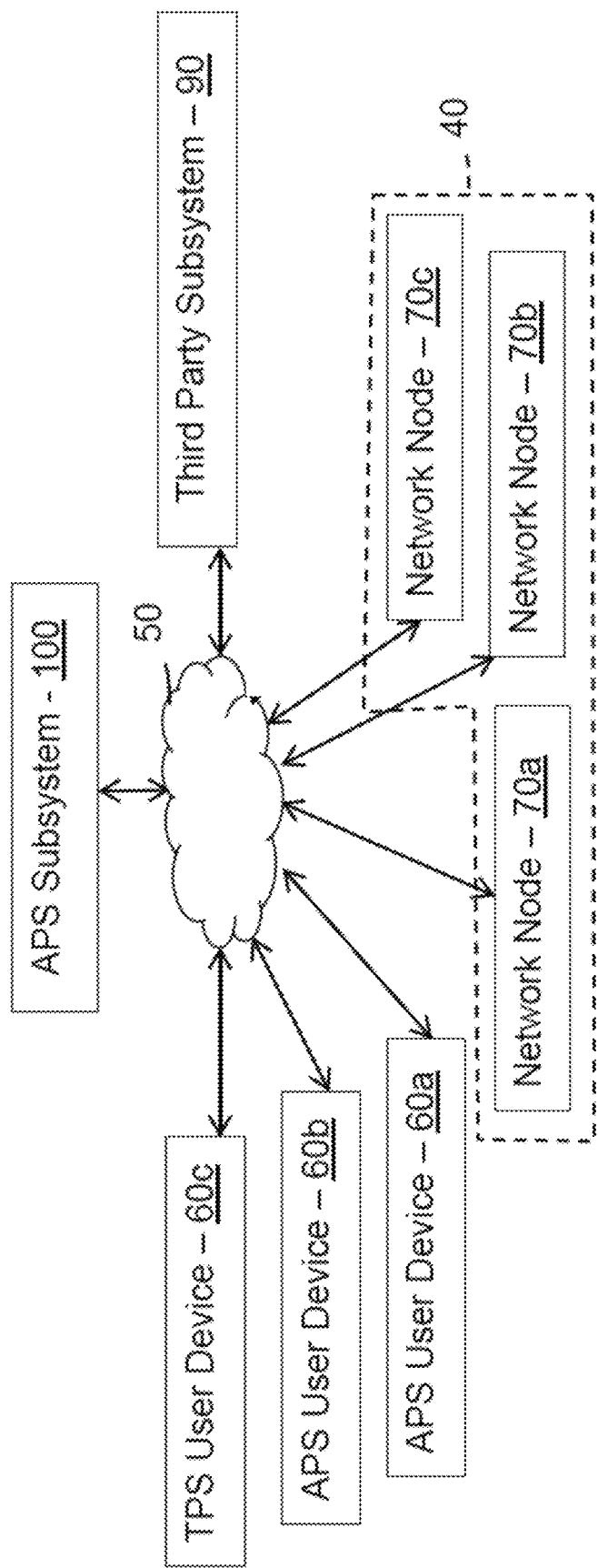
FIG. 1 is a schematic view of an illustrative system for providing an authentication processing service ("APS") of the disclosure, according to at least some embodiments.

Systems, methods, and computer-readable media for providing an authentication processing service are provided.

A lack of good entropy can leave a cryptosystem vulnerable and unable to encrypt data securely. The ability to generate high-entropy cryptographic keys from low min-entropy signals, such as biometrics and/or repeatable hardware noise, may enable the instantiation of secure and usable systems for facilitating any suitable secure operations (e.g., where users can authenticate, access resources, decrypt data, and/or sign documents without storing any secret key).

Schemes and protocols of this disclosure to implement this functionality may be configured to meet several conditions (e.g., simultaneously), including: (1) cryptographic key(s) generated from low min-entropy signal(s) ought to have high min-entropy regardless of min-entropy of the original signals; (2) it ought not be possible for any party with no access to a user's trusted device (e.g., without access to a trusted user device secret) to test whether a particular signal (e.g., a picture of the user for a face recognition system) matches a particular registered/enrolled user; and/or (3) the key generation process ought not disclose the signal, the device secret, and/or the cryptographic key being generated to any third party. An authentication processing service that satisfies condition (1) may guarantee that the cryptographic key(s) generated by this process can be used in a variety of scenarios, including, but not limited to, authentication, document encryption, document signing, and/or generation of cryptocurrency private keys. An authentication processing service that satisfies condition (2) may guarantee that a party with access to the user's biometric signal/biometric sample/template alone cannot generate the user's key. An authentication processing service that satisfies condition (3) may prevent disclosure of the original signal (e.g., biometric data), key, or device secret to any third party. Therefore, unlike some techniques, an authentication processing service of this disclosure may not require high-entropy input signals (e.g., signals that may be unrealistic in the case of biometrics and/or many hardware sources of repeatable noise), may not require that secret data stored on a user device is never disclosed (e.g., an unrealistic requirement for end-user devices (e.g., smartphones, smartwatches, smartcards, laptops, etc.) that are routinely lost or stolen), or may consider no trusted device.

Authentication processing services of this disclosure introduce a set of techniques that may fulfill some or all of these conditions (e.g., by adding one or more parties to the process that generates cryptographic keys). For example, with an authentication processing service ("APS") of this disclosure, one or more high-entropy cryptographic or APS keys k (e.g., server APS keys $k_1$-$k_n$) may be generated by mixing inputs from: (i) a low min-entropy biometric vector or sample ω (e.g., as may be processed or otherwise generated from any suitable user enrollment signals ub, such as any suitable biometric signals captured from a user, from some reproducible hardware noise, etc.); (ii) a codeword c randomly selected from a codeword space C (e.g., as may be defined by the system (e.g., by a particular ECC type) to provide at least a particular entropy (e.g., based on the size of the codespace (e.g., based on the number of codewords in the codeword space)); (iii) a trusted user device secret δ stored on a trusted user device; and (iv) one or more servers S (e.g., servers $S_1$-$S_n$), each of which may store a respective independent server secret s. With such an authentication processing service, a user may not disclose signals ub or ω or randomly selected codeword c or user device secret δ to any server(s), and each server S may not disclose its respective independent server secret s to the user or to any other server(s). The resulting high-entropy cryptographic APS key(s) k, as may be reconstructed by the user in conjunction with the trusted user device and server(s), may not be disclosed to the server(s). An authentication processing service of this disclosure may be suitable for a wide range of applications that may require the secrecy of the high-entropy cryptographic APS key being generated and/or that may require unlinkability between the high-entropy cryptographic APS key being generated and the original low min-entropy signal. Although any suitable characteristic may be used to distinguish between "high entropy" and "low entropy", in some embodiments, "high entropy" may correspond to at least 112 bits of entropy or at least 128 bits of entropy (e.g., more conservatively) or the like, while "low entropy" may correspond to less than 128 bits of entropy or less than 112 bits of entropy or the like.

FIGS. 1-1D

FIG. 1 is a schematic view of an illustrative system 1 in which authentication processing may be facilitated utilizing a trusted user device and one or more network nodes. For example, as shown in FIG. 1, system 1 may include an authentication processing service ("APS") subsystem 100, one or more user subsystems or devices 60 (e.g., one or more APS user subsystems or devices (e.g., APS user devices 60a and 60b) and/or one or more third party service ("TPS") user subsystems or devices (e.g., TPS user device 60c)), one or more network subsystems or servers or nodes 70 (e.g., network nodes 70a-70c), at least one third party enabler subsystem 90, and at least one communications network 50 through which APS subsystem 100 and at least one user device 60 and/or at least one network node 70 and/or at least one third party enabler subsystem 90 may communicate.

As shown in FIG. 1A, and as described in more detail below, a user device 60 (e.g., one, some, or each of devices 60a-60c of FIG. 1) may include a processor component 62, a memory component 63, a communications component 64, a sensor 65, an input/output ("I/O") component 66, a power supply component 67, a housing 61, and/or a bus 68 that may provide one or more wired or wireless communication links or paths for transferring data and/or power to, from, or between various other components of user device 60. In some embodiments, one or more components of user device 60 may be combined or omitted. Moreover, user device 60 may include other components not combined or included in FIG. 1A and/or several instances of the components shown in FIG. 1A. For the sake of simplicity, only one of each of the components of user device 60 is shown in FIG. 1A. I/O component 66 may include at least one input component (e.g., button, mouse, keyboard, etc.) to receive information from a user and/or at least one output component (e.g., audio speaker, video display, haptic component, etc.) to provide information to a user, such as a touch screen that may receive input information through a user's touch of a display screen and that may also provide visual information to a user via that same display screen. Memory 63 may include one or more storage mediums, including for example, a hard-drive, flash memory, permanent memory such as read-only memory ("ROM"), semi-permanent memory such as random access memory ("RAM"), any other suitable type of storage component, or any combination thereof (e.g., for storing data (e.g., user data 69*d*)). Communications component 64 may be provided to allow user device 60 to communicate with one or more other user devices 60 and/or network nodes 70 and/or a repository (not shown) and/or third party subsystem 90 and/or APS subsystem 100 using any suitable communications protocol (e.g., via communications network 50). Communications component 64 can be operative to create or connect to a communications network (e.g., network 50). Communications component 64 can provide wireless communications using any suitable short-range or long-range communications protocol, such as Wi-Fi (e.g., an 802.11 protocol), Bluetooth, radio frequency systems (e.g., 1200 MHz, 2.4 GHz, and 5.6 GHz communication systems), near field communication ("NFC"), infrared, protocols used by wireless and cellular telephones and personal e-mail devices, or any other protocol supporting wireless communications. Communications component 64 can also be operative to connect to a wired communications network or directly to another data source wirelessly or via one or more wired connections. Communications component 64 may be a network interface that may include the mechanical, electrical, and/or signaling circuitry for communicating data over physical links that may be coupled to network 50. Such network interface(s) may be configured to transmit and/or receive any suitable data using a variety of different communication protocols, including, but not limited to, TCP/IP, UDP, ATM, synchronous optical networks ("SONET"), any suitable wireless protocols, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access.

Sensor 65 may be any suitable sensor that may be configured to sense any suitable data for user device 60 (e.g., location-based data via a GPS sensor system, motion data, environmental data, biometric data, etc.). Sensor 65 may be a sensor assembly that may include any suitable sensor or any suitable combination of sensors operative to detect movements of user device 60 and/or of a user thereof and/or any other characteristics of user device 60 and/or of its environment (e.g., physical activity or other characteristics of a user of user device 60, light content of the device environment, gas pollution content of the device environment, noise pollution content of the device environment, altitude of the device, etc.). Sensor 65 may include any suitable sensor(s), including, but not limited to, one or more of a GPS sensor, wireless communication sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. Sensor 65 may include any suitable sensor components or subassemblies for detecting any suitable movement of user device 60 and/or of a user thereof. For example, sensor 65 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor 65 may include one or more single-axis or two-axis acceleration motion sensors that may be operative to detect linear acceleration only along each of the x- or left/right direction and the y- or up/down direction, or along any other pair of directions. In some embodiments, sensor 65 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 65 may be operative to directly or indirectly detect rotation, rotational movement, angular displacement, tilt, position, orientation, motion along a non-linear (e.g., arcuate) path, or any other non-linear motions. Additionally or alternatively, sensor 65 may include one or more angular rate, inertial, and/or gyro-motion sensors or gyroscopes for detecting rotational movement. For example, sensor 65 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor 65 for detecting motion on user device 60, such as any suitable pressure sensors, altimeters, or the like. Using sensor 65, user device 60 may be configured to determine a velocity, acceleration, orientation, and/or any other suitable motion attribute of user device 60. Sensor 65 may include any suitable sensor components or subassemblies for detecting any suitable biometric data and/or health data and/or sleep data and/or mindfulness data and/or the like of a user of user device 60. For example, sensor 65 may include any suitable biometric sensor that may include, but is not limited to, one or more facial recognition sensors, fingerprint scanners, iris scanners, retinal scanners, voice recognition sensors, gait sensors, hair sensors, hand geometry sensors, signature scanners, keystroke dynamics sensors, vein matching sensors, heart beat sensors, body temperature sensors, odor or scent sensors, behavioral biometric sensors (e.g., user behavioral modeling of movement, orientation, gesture, pausality, etc.), DNA sensors, sensors for any unclonable or extremely difficult to replicate personal function, and/or any other suitable sensors for detecting any suitable metrics related to any suitable characteristics of a user, which may also include health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. One or more biometric sensors may be multi-modal biometric sensors and/or operative to detect long-lived biometrics, modern liveness (e.g., active, passive, etc.) biometric detection, and/or the like. Sensor 65 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to user device 60 for attempting to authenticate a user), line-in connector for data and/or power, and/or combinations thereof. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Using one or more of these sensors, user device 60 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) of user device 60 can be used to determine a user's location (e.g., geo-location and/or address and/or location type (e.g., library, school, office, zoo, etc.)) and movement, as well as a displacement of the user's motion. An accelerometer, directional sensor, and/or gyroscope can further generate activity data that can be used to determine whether a user of user device 60 is engaging in an activity, is inactive, or is performing a gesture. Any suitable activity of a user may be tracked by sensor 65, including, but not limited to, steps taken, flights of stairs climbed, calories burned, distance walked, distance run, minutes of exercise performed and exercise quality, time of sleep and sleep quality, nutritional intake (e.g., foods ingested and their nutritional value), mindfulness activities and quantity and quality thereof (e.g., reading efficiency, data retention efficiency), any suitable work accomplishments of any suitable type (e.g., as may be sensed or logged by user input information indicative of such accomplishments), and/or the like. User device 60 can further include a timer that can be used, for example, to add time dimensions to various attributes of the detected physical activity, such as a duration of a user's physical activity or inactivity, time(s) of a day when the activity is detected or not detected, and/or the like. Sensor 65 may include any suitable sensor components or subassemblies for detecting any suitable characteristics of any suitable condition of the lighting of the environment of user device 60. For example, sensor 65 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of user device 60 (e.g., in lux or lumens per square meter, etc.) and/or for determining the ambient color or white point chromaticity of ambient light in the environment of user device 60 (e.g., in hue and colorfulness or in x/y parameters with respect to an x-y chromaticity space, etc.) and/or for determining the UV index or UV radiation in the environment of user device 60 (e.g., in UV index units, etc.).

A suitable light sensor may include, for example, a photodiode, a phototransistor, an integrated photodiode and amplifier, or any other suitable photo-sensitive device. In some embodiments, more than one light sensor may be integrated into user device 60. Sensor 65 may include any suitable sensor components or subassemblies for detecting any suitable characteristics of any suitable condition of the air quality of the environment of user device 60. For example, sensor 65 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of user device 60 (e.g., in $O_2$% per liter, etc.) and/or for determining the air velocity of the ambient air in the environment of user device 60 (e.g., in kilograms per second, etc.) and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of user device 60 (e.g., in HG % per liter, etc.) and/or for determining the humidity of the ambient air in the environment of device 100 (e.g., in grams of water per cubic meter, etc. (e.g., using a hygrometer)) and/or for determining the temperature of the ambient air in the environment of user device 60 (e.g., in degrees Celsius, etc. (e.g., using a thermometer)). Sensor 65 may include any suitable sensor components or subassemblies for detecting any suitable characteristics of any suitable condition of the sound quality of the environment of user device 60. For example, sensor 65 may include any suitable sound quality sensor that may include, but is not limited to, one or more microphones or the like that may determine the level of sound pollution or noise in the environment of user device 60 (e.g., in decibels, etc.). Sensor 65 may also include any other suitable sensor for determining any other suitable characteristics about a user of user device 60 and/or the environment of user device 60 and/or any situation within which user device 60 may be existing. For example, any suitable clock and/or position sensor(s) may be provided to determine the current time and/or time zone within which user device 60 may be located. Sensor 65 may be embedded in a body (e.g., housing 61) of user device 60, such as along a bottom surface that may be operative to contact a user, or can be positioned at any other desirable location. In some examples, different sensors can be placed in different locations inside or on the surfaces of user device 60 (e.g., some located inside housing 61 and some attached to an attachment mechanism (e.g., a wrist band coupled to a housing of a wearable device), or the like). In other examples, one or more sensors can be worn by a user separately as different parts of a single user device 60 or as different devices. In such cases, the sensors can be configured to communicate with user device 60 using a wired and/or wireless technology (e.g., via communications component 64). In some examples, sensors can be configured to communicate with each other and/or share data collected from one or more sensors. In some examples, user device 60 can be waterproof such that the sensors can detect a user's activity in water.

Power supply 67 can include any suitable circuitry for receiving and/or generating power, and for providing such power to one or more of the other components of user device 60. For example, power supply assembly 67 can be coupled to a power grid (e.g., when device 60 is not acting as a portable device or when a battery of the device is being charged at an electrical outlet with power generated by an electrical power plant). As another example, power supply assembly 67 may be configured to generate power from a natural source (e.g., solar power using solar cells). As another example, power supply assembly 67 can include one or more batteries for providing power (e.g., when device 60 is acting as a portable device). User device 60 may also be provided with a housing 61 that may at least partially enclose one or more of the components of user device 60 for protection from debris and other degrading forces external to user device 60. Each component of user device 60 may be included in the same housing 61 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, user device 60 may include other components not combined or included in those shown or several instances of the components shown.

Processor 62 may be used to run one or more applications, such as an application 69 that may be accessible from memory 63 (e.g., as a portion of user data 69*d*) and/or any other suitable source (e.g., from network 50 via APS subsystem 100 or any other subsystem and an active internet or other suitable data connection). Application 69 may include, but is not limited to, one or more operating system applications, firmware applications, communication applications (e.g., for enabling communication of data between user devices 60 and APS subsystem 100 and/or nodes 70 and/or third party subsystem 90), third party service applications (e.g., wallet applications, banking applications social media applications, etc.), internet browsing applications (e.g., for interacting with a website provided by a third party subsystem 90 and/or by APS subsystem 100 for enabling user device 60 to interact with an online service), application programming interfaces ("APIs"), software development kits ("SDKs"), APS applications (e.g., a web application or a native application that may be at least partially produced by APS subsystem 100 for enabling user device 60 to interact with an online service and/or one or more network nodes 70 and/or a third party subsystem 90), or any other suitable applications. For example, processor 62 may load an application 69 as a user interface program to determine how instructions or data received via an input component of I/O component 66 or other component of client subsystem 60 (e.g., sensor 65 and/or communications component 64) may manipulate the way in which information may be stored (e.g., in memory 63) and/or provided to the user via an output component of I/O component 66 and/or to another subsystem via communications component 64. As one example, application 69 may provide a user with the ability to interact with an authentication processing service platform ("APSP") of system 1, where application 69 may be a third party application that may be running on user device 60 (e.g., an application associated with APS subsystem 100 and/or third party subsystem 90) that may be loaded on user device 60 (e.g., using communications component 64) via an application market, such as the Apple App Store or Google Play, or that may be accessed via an internet application or web browser (e.g., by Apple Safari or Google Chrome) that may be running on user device 60 and that may be pointed to a uniform resource locator ("URL") whose target or web resource may be managed by or otherwise affiliated with the APSP.

User device 60 may be any portable, mobile, wearable, implantable, or hand-held electronic device configured to operate with the APSP of system 1. Alternatively, user device 60 may not be portable during use, but may instead be generally stationary. User device 60 can include, but is not limited to, a media player, video player, still image player, game player, other media player, music recorder, movie or video camera or recorder, still camera, other media recorder, radio, medical equipment, domestic appliance, smart appliance (e.g., smart door knob, smart door lock, etc.), transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, internet of things ("IoT") device, virtualized IoT device (e.g., cloud compute instance), modem, RFID card, network equipment, router, printer, kiosk (e.g., a public kiosk that may be used to provide a personal virtual device by enrolling and/or authenticating various users through distinct enrollment and/or authentication processes), beacon (e.g., a Bluetooth low energy beacon transmitter device), and any combinations thereof. A user device (e.g., a trusted user device) may be any suitable device that may be operative to store a trusted user device secret (e.g., secret $\delta$), and may, in some embodiments, have the ability to run cryptographic computation and/or to communicate with one or more servers (e.g., device 60*a* of FIGS. 2, 4, and 5) and/or be provided as a low-power trusted device (e.g., a smart card, RFID tag, etc.) or even a passive device (e.g., a magnetic strip) (e.g., device 60*b* of FIGS. 3, 6, and 7), for example, when there may be some semi-trusted infrastructure (e.g., TPS device 60*c*) that can perform part of the computation that may be required to authenticate the user. In some embodiments, a sensor and a user device can be the same entity. A sensor extracting user biometrics ub and/or processing a biometric template $\omega$ or biometric sample $\omega'$ and a device storing secret $\delta$ can be located on the same device (e.g., in the case of a smartphone equipped with a front-facing camera or a fingerprint scanner), or can exist on different devices, as in the case of a system that may use a smartcard or access card (e.g., trusted device) possessed by a user and a camera that may capture ub/$\omega$ at a gate or semi trusted device.

As shown in FIG. 1B, network node 70 (e.g., one, some, or each of nodes 70*a*-70*c* of FIG. 1) may include a processor component 72 that may be similar to processor 62, an application 79 that may be similar to application 69, a memory component 73 that may be similar to memory component 63 (e.g., for storing data (e.g., node APSP data 79*d*)), a communications component 74 that may be similar to communications component 64, a sensor 75 that may be similar to sensor 65, an I/O component 76 that may be similar to I/O component 66, a power supply component 77 that may be similar to power supply component 67, a housing 71 that may be similar to housing 61, and/or a bus 78 that may be similar to bus 68. One, some, or each communications component 64 and/or one, some, or each communications component 74 may be a network interface that may include the mechanical, electrical, and signaling circuitry for communicating data over physical links coupled to network 50.

As shown in FIG. 1C, third party subsystem 90 may include a processor component 92 that may be similar to processor 62, an application 99 that may be similar to application 69, a memory component 93 that may be similar to memory component 63 (e.g., for storing data (e.g., third party APSP data 99d)), a communications component 94 that may be similar to communications component 64, a sensor 95 that may be similar to sensor 65, an I/O component 96 that may be similar to I/O component 66, a power supply component 97 that may be similar to power supply component 67, a housing 81 that may be similar to housing 61, and/or a bus 98 that may be similar to bus 68. One, some, or each communications component 64 and/or one, some, or each communications component 94 may be a network interface that may include the mechanical, electrical, and signaling circuitry for communicating data over physical links coupled to network 50.

As shown in FIG. 1D, APS subsystem 100 may include a processor component 12 that may be similar to processor 62, a memory component 13 that may be similar to memory component 63 (e.g., for storing data (e.g., APS subsystem APSP data 19d)), a communications component 14 that may be similar to communications component 64, a sensor 15 that may be similar to sensor 65, an I/O component 16 that may be similar to I/O component 66, a power supply component 17 that may be similar to power supply component 67, a housing 11 that may be similar to housing 61, and/or a bus 18 that may be similar to bus 68. APS subsystem APSP data 19d may include one or more data sources or data structures that may include any suitable data and/or applications (e.g., application 69 for use by user device 60 and/or application 79 for use by a network node and/or an application 19 that may be run by processor 12 of APS subsystem 100 and/or the like) for facilitating an authentication processing service or APSP that may be provided by APS subsystem 100 and/or any other entities of system 1 to one or more users. Some or all portions of APS subsystem 100 may be operated, managed, or otherwise at least partially controlled by an entity responsible for providing to one or more users or entities of system 1 an authentication processing service or APSP, which may be referred to herein as a Keyless™ platform.

APS subsystem 100 may communicate with one or more user devices 60 and/or network nodes 70 and/or third party enabler subsystems 90 via one or more communications networks 50, and/or any user device 60 may communicate with any other user device 60 and/or network node 70 and/or subsystem 90 via one or more communications networks 50, and/or any network node 70 may communicate with any other network node 70 and/or user device 60 and/or subsystem 90 via one or more communications networks 50. Network 50 may be the internet or any other network for communicatively coupling any two entities or devices or nodes or subsystems of system 1 that may be remote from one another, such that when interconnected, a user device 60 may access information (e.g., an API, SDK, protocol, application, etc. (e.g., from data structure 19d of APS subsystem 100, as may be provided as an authentication processing service via processor 12 of APS subsystem 100)) as if such information were stored locally at that user device (e.g., in memory component 63).

A user device 60 may be configured to enroll and then authenticate itself and a user with the APSP of system 1 by following any suitable APSP protocols, such as by using any suitable client application (e.g., any suitable APSP-enabled application) that may be running on the user device, while each server or node 70 may be used to store its own independent server secret s for helping generate a respective APS key k and/or store any suitable enrollment data (e.g., user device public key pk) for helping authenticate a user device. For example, a client application 69 (e.g., an APSP app (e.g., as may be created and/or managed or otherwise at least partially under the auspices of APS subsystem 100)) may be run on a user device 60a that may include an APSP API and/or an APSP SDK, which may be at least partially defined by APS subsystem 100. An APSP API of a client application 69 may be configured to enable interaction with any suitable user device components (e.g., biometric sensors for capturing data (e.g., a camera for capturing images) indicative of the user's biometrics). An APSP SDK of a client application 69 may be configured to include or define a client-/user-side secure multi-party computation ("SMPC") protocol engine and/or any suitable pseudorandom function family ("PRF") (e.g., any suitable efficiently-computable function of the PRF and/or any suitable oblivious pseudorandom function ("OPRF")) and/or a communication protocol for enabling interaction between the user device and various network nodes (e.g., for processing of a captured biometrics image and/or otherwise obtaining a biometric template or biometric sample or low min-entropy signal ω, selecting a codeword c, computing a user device secret δ using ω and c, running an instance of a two-party protocol with each of one or more server nodes to generate a respective APS key k, and using the APS key k to generate enrollment data and/or for recreation to prove authentication data). Moreover, each one of network nodes 70 (e.g., nodes 70a-70c) may be configured to run any suitable application(s) (e.g., a respective node application 79) that may include any suitable SMPC/PRF engine(s) and/or any suitable APSP protocol(s), which may be at least partially defined by APS subsystem 100.

During APSP enrollment of a user device 60a, which may be referred to herein as an APS user device 60a that may be used to capture a user's biometrics ub or otherwise for obtaining any suitable low min-entropy signal a) (e.g., a biometric signal, some reproducible hardware noise, etc.) or otherwise obtain such a signal for user enrollment and/or user authentication with the APSP (e.g., for storage of a trusted user device secret δ and/or cryptographic computation and communication with network node(s)), the APS user device may be configured to generate or otherwise obtain or reconstruct any suitable high-entropy cryptographic key(s) k or seed(s) (e.g., secret value(s) (e.g., any value(s) that may be confidential and/or lack predictability)). Due to the high entropy of such a cryptographic key, this cryptographic key may be suitable for a variety of applications, including, but not limited to, encrypting and/or decrypting data, deterministically generating a signing key-pair (e.g., generating and, therefore, also, reconstructing the signing key on demand), generating one-time passwords (e.g., using time-based one-time password ("TOTP") algorithms), generating multiple keys using a deterministic key derivation scheme, and/or the like. Certain ones of such keys (e.g., public key(s) pk) that may be generated by such a high-entropy cryptographic key k may be communicated to and stored on one or more network nodes 70 or third party subsystems 90 by the APS user device 60a for enabling registration and enrollment of the APS user device and a user thereof with the APSP and/or third party ("TP") subsystem 90. APS subsystem 100 and/or third party subsystem 90 or any suitable repository subsystem (not shown in FIG. 1) may be utilized by the system to store any suitable data for associating a user identifier and/or device identifier with any suitable keys (e.g., using blockchain, distributed identities ("DIDs"), etc.), such that the data may be accessible by various other entities of the system (e.g., via network 50) (e.g., for associating various device identifiers (e.g., various public device signing keys of various devices) with a particular user identifier (e.g., a public user key)). For example, such a repository may be distinct from each network node, or may be a network node, or may be a part of APS subsystem 100. APS user device 60a may also be configured to capture any suitable user biometrics ub (e.g., user enrollment biometrics ueb or user authentication biometrics uab) of a device user U (e.g., using sensor 65 and/or any other suitable features of that user device 60a). For example, during enrollment, the APS user device may be configured to capture any suitable user enrollment biometrics of the user, and those captured user enrollment biometrics may be used by the APS user device to generate an enrollment biometric template ("EBT") ω (e.g., a user's face may be captured as an image by the user device (e.g., using a camera sensor), and a cropped and/or resized version of that image may be provided as input to a neural network to produce an embedding that may be used as the EBT (e.g., an EBT may be obtained as a feature vector from the captured user enrollment biometrics)). As another example, during authentication, the APS user device may be configured to capture any suitable user authentication biometrics of the user, and those captured user authentication biometrics may be used by the APS user device to generate an authentication biometric sample ("ABS") ω' (e.g., a user's face may be captured as an image by the user device (e.g., using a camera sensor), and a cropped and/or resized version of that image may be provided as input to a neural network to produce an embedding that may be used as the ABS (e.g., an ABS may be obtained as a feature vector from the captured user enrollment biometrics)). Although described herein with respect to a user's biometrics, it is understood that any suitable original signal(s) (e.g., a low min-entropy signal ω or ω' (e.g., enrollment/authentication vectors)) may be generated based on any suitable biometrics, repeatable/reproducible hardware noise, physically or physical unclonable function ("PUF"), and/or the like as signals ub that may be indicative of any suitable metrics or characteristics of a user and/or a device controlled by the user. Furthermore, during such enrollment, the APS user device may be configured to select a codeword c, compute a user device secret δ using ω and c, run an instance of a two-party protocol with each of one or more server nodes to generate a respective APS key k, and use the APS key k to generate enrollment data (e.g., enrollment payload data) that may be stored on one or more respective server nodes and/or third party subsystems and/or trusted user devices/access cards (e.g., for enrollment of the device/user with the APSP and later used for authentication, and/or for recreation to prove authentication data).

After enrollment with the APSP, APS user device 60 may then be used to authenticate its user with the APSP. The APS user device may be configured to follow an APSP protocol for such authenticating. APS user device 60 may be configured to authenticate the device itself with the APSP (e.g., by properly signing, with a private key reconstructed by the device, a challenge from each one of the various network nodes that may have access (e.g., locally and/or via a repository) to a corresponding public key used during the device registration phase of the enrollment (e.g., a public key pk generated using an APS key k)). After enrollment, APS user device 60 may be configured to authenticate its user, first by capturing any suitable user authentication biometrics of its user that may then be used to generate an authentication biometric sample ("ABS") ω' (e.g., user authentication biometrics similar to the user enrollment biometrics used to generate the EBT of the enrollment (e.g., picture(s) of the user's face, scan(s) of the user's fingerprints, etc.)). This ABS may then be used by the APS user device to reconstruct the APS key (e.g., as APSR key k') using trusted user device secret δ, and then to eventually reconstructed a private signing key (e.g., private key sk'). Then APS user device 60 may be configured to authenticate itself/the user with the APSP/node (e.g., by properly signing, with the reconstructed private key of the device, a challenge from a server node or third party subsystem that may have access (e.g., locally and/or via a repository) to a corresponding public key used during the device registration phase of the enrollment). If the reconstruction by the user device is successful, the node/third party will be able to unsign the returned signed challenge, thereby enabling the node/third party to authenticate the user device, all without the node/third party ever having access to the EBT ω/ABS ω' itself or the APS key k or APSR key k' or the trusted user device secret δ.

If an evaluation by a node/third party subsystem of a user device's response to the challenge is successful (e.g., if the node/third party subsystem is able to successfully recover the challenge by unsigning the signed response), then the node/third party subsystem may be enabled to authenticate the user device for enabling any suitable secure operation (e.g., seamless authentication, unique identification, access control, key generation, e-signature, etc.) with any suitable service locally on the APS user device (e.g., using the reconstructed APSR key or a key derived therefrom for any suitable purpose, including, but not limited to, encrypting/decrypting a hard drive portion of the device's memory, for encrypting or signing a cryptocurrency transaction with a user's digital wallet on the device for publishing on the blockchain, etc.) and/or with any suitable service provided by any suitable third party subsystem 90 (e.g., using the reconstructed APSR key or a key derived therefrom for enabling secure user access via a third party app or website browser to a server of a third party website (e.g., a social network site or banking site) or an identity and access management ("IAM") server) in any suitable sector (e.g., e-wallets, fintech, banking, enterprise, A&D/travel, healthcare, government, etc.). A secure operation may be any process that generates, persists, and/or uses secret keys (including private keys) using a recovered or reconstructed APSR key of the APSP (e.g., any of the processes described herein) to enable such a secure operation. For example, an APS user device may be configured to perform any suitable action with a recovered and successfully authenticated APSR key, including but not limited to, deriving a DID key and issuing a signed claim associated with a user's identity, deriving a crypto wallet secret key to perform a cryptocurrency transaction, deriving a list of crypto wallet public keys to check a user's balance, deriving a third party key and then using that third party key to sign or encrypt a challenge from a third party, and/or the like. Once an APSR key is recovered and used by the APS user device for any suitable purpose (e.g., a one-time use), the APSR key may be deleted from the APS user device (e.g., pursuant to the APSP protocol).

Therefore, between the end of APS enrollment (see, e.g., process 400 of FIG. 4) and successful APS authentication (see, e.g., process 500 of FIG. 5), as well as between authentications, user biometrics ueb and/or uab, low min-entropy signals ω and/or ω', the APS key k, APSR key k', any keys generated therefrom (e.g., pk, sk, pk', sk', etc.) and/or hashes generated therefrom (e.g., h(k), h(k), etc.) and/or any other suitable enrollment/authentication payload data, codeword c and/or c', and/or the like may not be stored on or accessible to the APS user device or any central server or individual entity or node/third party subsystem, but, instead, only a trusted user device secret δ may be stored on the APS user device while a public key (e.g., pk derived from an APS key k) or other enrollment payload data based on (e.g., derived from (e.g., using a deterministic and/or secure function)) the high-entropy cryptographic or APS key(s) k may be stored on the one or more server nodes nodes/third party subsystems (e.g., respective enrollment information distributed amongst various network nodes (or on a single node) or one or more third party subsystems).

Enrollment biometrics of a user may be captured and processed (e.g., by feature extraction through a neural network) as an EBT that, along with a random enrollment codeword, may be used by a trusted user device to define a trusted user device secret, while the random enrollment codeword may also be used by the trusted user device in an instance of a two-party protocol (e.g., OPRF) with a server secret of at least one server node for generating a respective at least one high-entropy cryptographic APS key. The APS key may be used to generate any suitable enrollment data that may be at least partially shared with one or more server nodes or third party subsystems for enrolling the trusted user device, while the trusted user device secret may be stored on a trusted user device, and while the biometric and EBT and APS key and enrollment codeword may be deleted from the system. Later, the trusted user device may then capture and process other user biometrics as an ABS, and the trusted user device secret may be used with the ABS to recreate the codeword, which may then be used by the trusted user device in an instance of a two-party protocol (e.g., OPRF) with a server secret of at least one server node for recreating a respective at least one high-entropy cryptographic APS key, which may be used in any suitable manner to authenticate the enrollment payload data (e.g., pk/sk, h(k), etc.) for authenticating the trusted user device for use in a secure authentication-dependent operation. Benefits of such enrollment and authentication according to the APSP are numerous, including, but not limited to, avoiding the long term storage of sensitive information (e.g., any high-entropy cryptographic APS key, any low min-entropy biometric signal, any codeword, or enrollment data) on a trusted user device or on any central server or third party subsystem (e.g., between APS enrollment and APS authentication or between distinct authentications), consistent cross-platform user experience (e.g., for APS user devices of various types and/or running various operating systems, for TPS user devices of various types and/or running various operating systems, for different phases of the APSP (e.g., APS enrollment, APS authentication, TPS enrollment, TPS authentication, various secure operations, etc.)), fast and local user authentication on its own user device, maintaining a user's ability to be in control of its personal data, and/or the like. The cryptographic APS key(s) generated from the low min-entropy signal(s) EBT/ABS may have high min-entropy regardless of min-entropy of the original signals, it may not be possible for any party with no access to a user's trusted device (e.g., without access to a trusted user device secret) to test whether a particular signal (e.g., a picture of the user for a face recognition system) matches a particular registered/enrolled user, and the key generation process may not disclose the low min-entropy biometric signal(s), the device secret, and/or the cryptographic key(s) being generated to any third party or any server node(s). The security provided by this APSP may allow for a user and a decentralized and distributed system, rather than a central server (e.g., a company's central server), to be in control, as there may be no APS key enabling authentication that is permanently stored on any one entity (e.g., no honeypot, no authentication secrets stored on a user device or on a single network node, etc.), and the APSP may provide a true password-less environment. The APSP system may be robust such that if one or more portions (e.g., nodes) of the system are down (e.g., not functioning properly), the APSP may still function properly. Different nodes may be controlled (e.g., managed, maintained, operated, etc.) by different entities, which may allow control and costs to be split, which may increase the robustness of the system. The privacy provided by this APSP may be compliant with General Data Protection Regulation ("GDPR"). Zero-knowledge biometric authentication may be enabled, and a user may be enabled by the APSP to control what data is shared via selective data disclosure.

The APSP may solve a credential storage problem by providing a way to authenticate a user's biometrics for enabling a secure operation that may use distributed computation, threshold cryptography, and/or SMPC to regenerate or recombine or otherwise recover a user's APS key. With the APSP, users (e.g., their biometrics) may become their passwords and control their credentials through biometrics. The APSP may create a zero-knowledge system to achieve biometric authentication for enabling a secure operation without having to share the biometric template data or APS key with those that may depend on the result of the authentication (e.g., a third party subsystem (e.g., a social media website's server or IAM server)). During an enrollment phase of the APSP, a user may register itself (e.g., register the user's biometrics) and its user device with the APSP network. This may include storing any suitable enrollment data generated by an APS key in a distributed form on one or more nodes. During an authentication phase of the APSP, the user may provide authentication biometrics for generating an ABS for enabling user authentication. The ABS may be used to regenerate a codeword that may then be used to regenerate an APS key in conjunction with a respective network node. Therefore, the APSP protocol may remain secure even if some of the nodes and user devices are compromised. Specifically, the APSP protocol may guarantee that a party with access to the user's biometric signal alone cannot generate the user's APS key. Additionally or alternatively, the APSP protocol may prevent disclosure of the original signal (e.g., biometric data), APS key, or device secret to any third party and/or any network node. Specifically, secret user information (e.g., biometric data, APS key, etc.) may not be disclosed if an adversary is able to control all nodes, or if an adversary is able to control the APS user device and a subset of the nodes below a user-defined threshold. Further, in some embodiments, the only information related to a specific user or user device that may be stored on a node/third party subsystem may be shared enrollment payload information (e.g., a public key generated by an APS key). This can make brute-force offline attacks on the data stored on the nodes impractical.

Each node 70 may be any suitable server or device or subsystem that may be independently operated or at least partially managed by a single entity (e.g., a manager of APS subsystem 100). In some embodiments, a node 70 may be provided by a user device 60 for use by another user (e.g., one user device 60 of system 1 may be configured to operate as a node 70 for another user device 60 of system 1). Nodes 70 of system 1 ought to be available and non-colluding. For example, an APSP network 40 (e.g., a decentralized and/or distributed network) of system 1 may include two or more nodes 70. In some embodiments, an APSP network 40 may include one or more user devices that may be at least partially configured as a node for one or more other user devices. Network 40 may be designed to scale to a geographically-distributed, large number of users. As a result, the APSP protocol may be configured to adhere to one or more suitable design requirements, including, but not limited to, the capacity of the network (e.g., the number of users that the network can handle) ought to increase linearly with the number of nodes, if a number of the nodes fail, the network ought to still be operational for the vast majority of the users, and/or the like. At any point in time a user device may be enrolled with or authenticating with a particular (e.g., fixed) subset of the nodes in the network. Adding new nodes may enable more users to effectively use the network. Additionally or alternatively, recovering one or more APS key(s) may require only a small number of nodes in the network to be operational at any point in time. To reduce latency, the nodes can be strategically placed close to their users. Given the availability of geographically distributed data centers from major cloud providers, this may be a simple and cost-effective way to improve user experience and provide quality of service. For segregated networks (e.g., enterprise, etc.), nodes can be deployed within the perimeter of the segregated network. For air-gapped networks (e.g., military, intelligence, and disaster recovery networks, etc.), nodes can be deployed inside the air-gapped network.

FIG. 2

Figure 2:
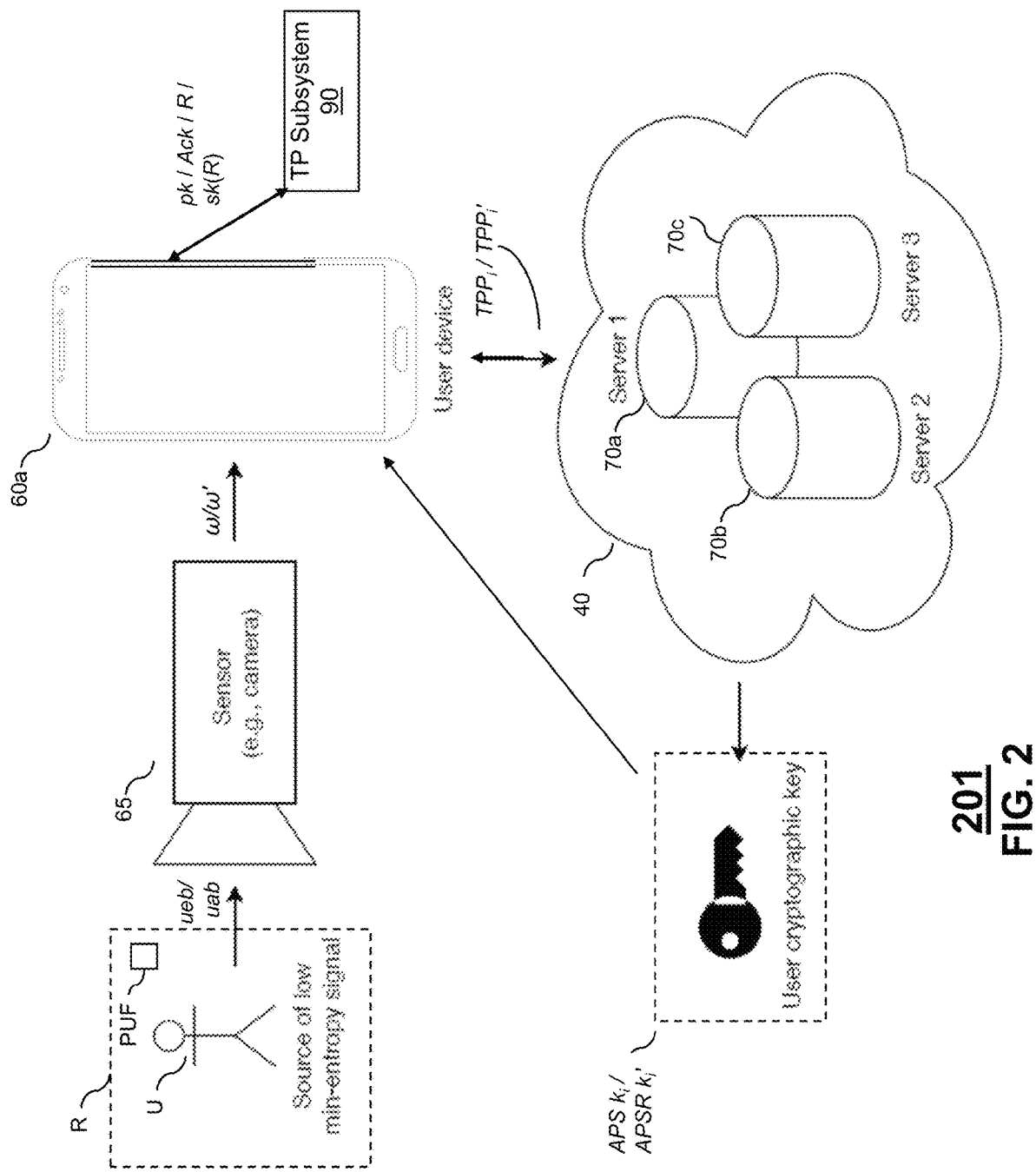
FIG. 2 is a more detailed schematic view of another illustrative system for providing an APS of the disclosure, according to at least some embodiments.

Various arrangements of devices may be used for providing a useful system for implementing an APSP protocol of the disclosure. For example, as shown in FIG. 2, an APS system 201 may include or use any suitable original signal(s) source R for providing one or more original (e.g., low min-entropy) signals, including, but not limited to, a user U (e.g., a human being, pet, etc.), any suitable physically unclonable function ("PUF"), and/or the like that may generate any suitable signal(s) (e.g., ueb, uab, etc.). Any suitable sensor(s) 65 may be provided by system 201 for capturing the one or more original signals from source R. Any suitable type of APS user device 60a may be provided for obtaining any suitable low min-entropy signal or enrollment/authentication vector ω/ω' (e.g., EBT, ABS, etc.) based on the captured original signal(s). For example, as shown, APS user device 60a may be provided as a smart device (e.g., an iPhone™ by Apple Inc.), which may include a smart card and/or any suitable radio-frequency identification ("RFID") chip. In some embodiments, APS user device 60a may include sensor(s) 65 that may capture the one or more original signals (e.g., a camera built into the smart device). Additionally or alternatively, sensor(s) 65 that may capture the one or more original signals may be distinct from but communicatively couplable to APS user device 60a (e.g., such sensor(s) 65 may be provided by an APS subsystem or a third party subsystem or the like). In some embodiments, APS user device 60a may be configured to process any captured original signals for generating any suitable low min-entropy signal or enrollment/authentication vector ω/ω'. Alternatively, any suitable remote component(s) or subsystem(s) may be configured to process any captured original signals for generating any suitable low min-entropy signal or enrollment/authentication vector ω/ω'. In some embodiments, a source R may be provided by APS user device 60a (e.g., a PUF component may be a component of APS user device 60a) that may generate any suitable original signal(s) for the APSP protocol. System 201 may include any suitable network or server node 70 or any suitable plural number of nodes 70 (e.g., nodes 70a-70c) of a network 40 that may be in communication with user device 60a. Device 60a may work with server(s) 701-n to communicate any suitable two-party protocol ("TPP") data (e.g., $TPP_i$, $TPP_i'$, etc.) for enabling generation of any respective APS keys (e.g., APS k, APSR k', etc.) that may further facilitate the APSP protocol with any suitable third party subsystem 90 (e.g., an e-mail server or any other suitable service that may require user enrollment and authentication prior to enabling a secure operation of the service), such as for storing enrollment payload data (e.g., pk) and/or communicating any suitable challenges R and responses sk(R) (e.g., as described with respect to FIGS. 4 and 5).

FIG. 3

Figure 3:
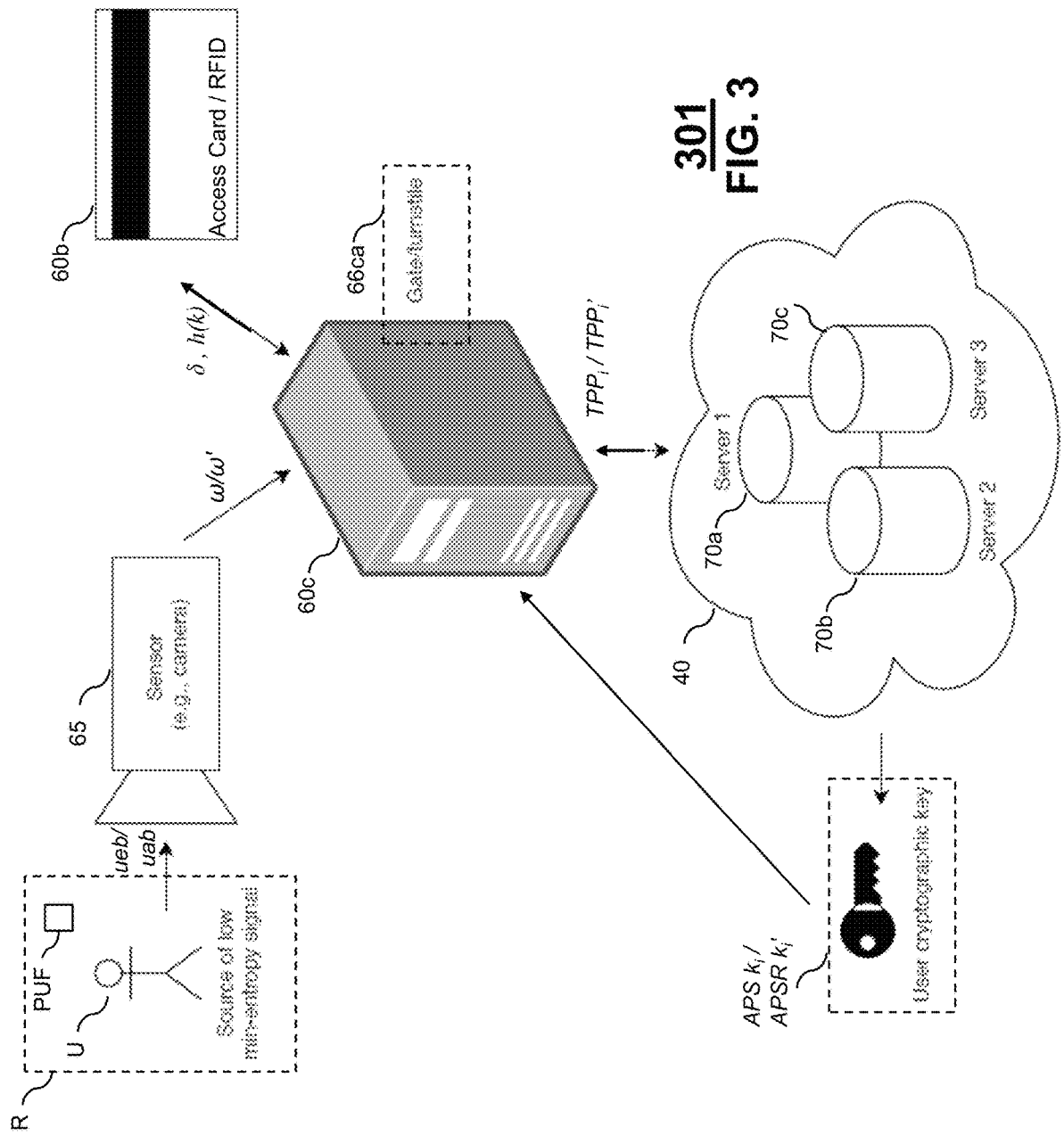
FIG. 3 is a more detailed schematic view of yet another illustrative system for providing an APS of the disclosure, according to at least some embodiments.

Various other arrangements of devices may be used for providing a useful system for implementing an APSP protocol of the disclosure. For example, as shown in FIG. 3, an alternative APS system 301 may include or use any suitable original signal(s) source R for providing one or more original (e.g., low min-entropy) signals, including, but not limited to, a user U (e.g., a human being, pet, etc.), any suitable physically unclonable function ("PUF"), and/or the like that may generate any suitable signal(s) (e.g., ueb, uab, etc.). Any suitable sensor(s) 65 may be provided by system 301 for capturing the one or more original signals from source R. Any suitable type of TPS user device 60c may be provided for obtaining any suitable low min-entropy signal or enrollment/authentication vector ω/ω' (e.g., EBT, ABS, etc.) based on the captured original signal(s). For example, as shown, TPS user device 60c may be provided as a computing device (e.g., a desktop computing assembly). A third party service ("TPS") application that may be running on a TPS user device 60c, which may be the same as enrolled APS user device 60a or may be a different device that may not be enrolled with (or even may not be able to enroll with) the APSP but may nevertheless be used by user U to interact with the system for gaining the benefit of enrollment/authentication of the APSP. As shown, in some embodiments, TPS user device 60c may include any suitable access control component(s) 66c, such as a gate or turnstile (e.g., for selectively enabling physical access of a user to an environment (e.g., a venue, a subway system, etc.)). In some embodiments, such a TPS device 60c may be referred to herein as a relying party device and/or a semi-trusted device/infrastructure. System 301 may include any suitable trusted user device 60b (e.g., APS device 60b) that may be provided for receiving and storing and sharing any suitable trusted user device secret (e.g., secret δ) and/or the like (e.g., a hash of an APS key k (e.g., h)) with TPS user device 60c. User device 60b may be any suitable type of device (e.g., a smart card and/or any suitable radio-frequency identification ("RFID") chip), where device 60b may be any suitable passive user device or access card (e.g., a card with a magnetic strip) or any suitable smart card or device that may store one or more secret(s) δ and H(k) for some secure collision-resistant cryptographic hash function H(•). In some embodiments, device 60b may be passive and not be configured to carry out any (or at least any significant) processing of data, but may rather be used to receive and store or share any suitable data with device 60c. For example device 60b may be similar to a transit pass that may be scanned or otherwise communicate over a short path (e.g., with a smart turnstile device 60c) but may not be configured to communicate directly with servers 70. In some embodiments, TPS device 60c may include sensor(s) 65 that may capture the one or more original signals (e.g., a camera built into the smart device). Additionally or alternatively, sensor(s) 65 that may capture the one or more original signals may be distinct from but communicatively couplable to TPS user device 60c (e.g., such sensor(s) 65 may be provided by an APS subsystem or a third party subsystem or the like). In some embodiments, TPS user device 60c may be configured to process any captured original signals for generating any suitable low min-entropy signal or enrollment/authentication vector ω/ω'. Alternatively, any suitable remote component(s) or subsystem(s) may be configured to process any captured original signals for generating any suitable low min-entropy signal or enrollment/authentication vector ω/ω'. In some embodiments, a source R may be provided by APS user device 60b (e.g., a PUF component may be a component of APS user device 60b) that may generate any suitable original signal(s) for the APSP protocol. System 301 may include any suitable network or server node 70 or any suitable plural number of nodes 70 (e.g., nodes 70a-70c) of a network 40 that may be in communication with TPS device 60c. Device 60c may work with server(s) 701-n to communicate any suitable two-party protocol ("TPP") data (e.g., $TPP_i$, $TPP_i'$, etc.) for enabling generation of any respective APS keys (e.g., APS ki, APSR ki', etc.) that may further facilitate the APSP protocol (e.g., as described with respect to FIGS. 6 and 7). While in system 201, APS device 60a may be configured to work as a storage device and networking device (e.g., with network nodes 70) and computing device (e.g., for generating keys, etc.), APS device 60b of system 301 may simply be a passive device for storing and sharing data with TPS device 60c, while TPS device 60c may be configured to work as a networking device (e.g., with network nodes 70) and computing device (e.g., for generating keys, etc.). Even if a user were to lose APS device 60b of system 301 to an untrustworthy entity after enrollment, that entity would not be able to generate the user biometrics ub that may be necessary to authenticate with that APS device 60b. While, in practice, if an attacker were able to capture a user's APS device 60a of system 201 after enrollment, the user may be able to report their device lost or stolen and the device could be disabled and/or the servers could be configured to refuse any authentication interaction with the device, or, if not reported lost/stolen, such an enrolled APS device 60a could still be prevented from reconstructing the APS key(s) as long as the attacker was unable to compromise more than a threshold t amount of servers. Therefore, one embodiment of system 301 of FIG. 3 may include TPS device 60c being a network coupled computing device with the ability to detect any suitable user biometrics and control any suitable physical access as a security barrier (e.g., control a turnstile to a subway system, control a smart doorknob to a hotel room, etc.), while user device 60b may be a passive RFID access card (e.g., basic subway transit card) or a smartphone or some other device that may be carried by a user.

FIGS. 4-8I

Figure 4:
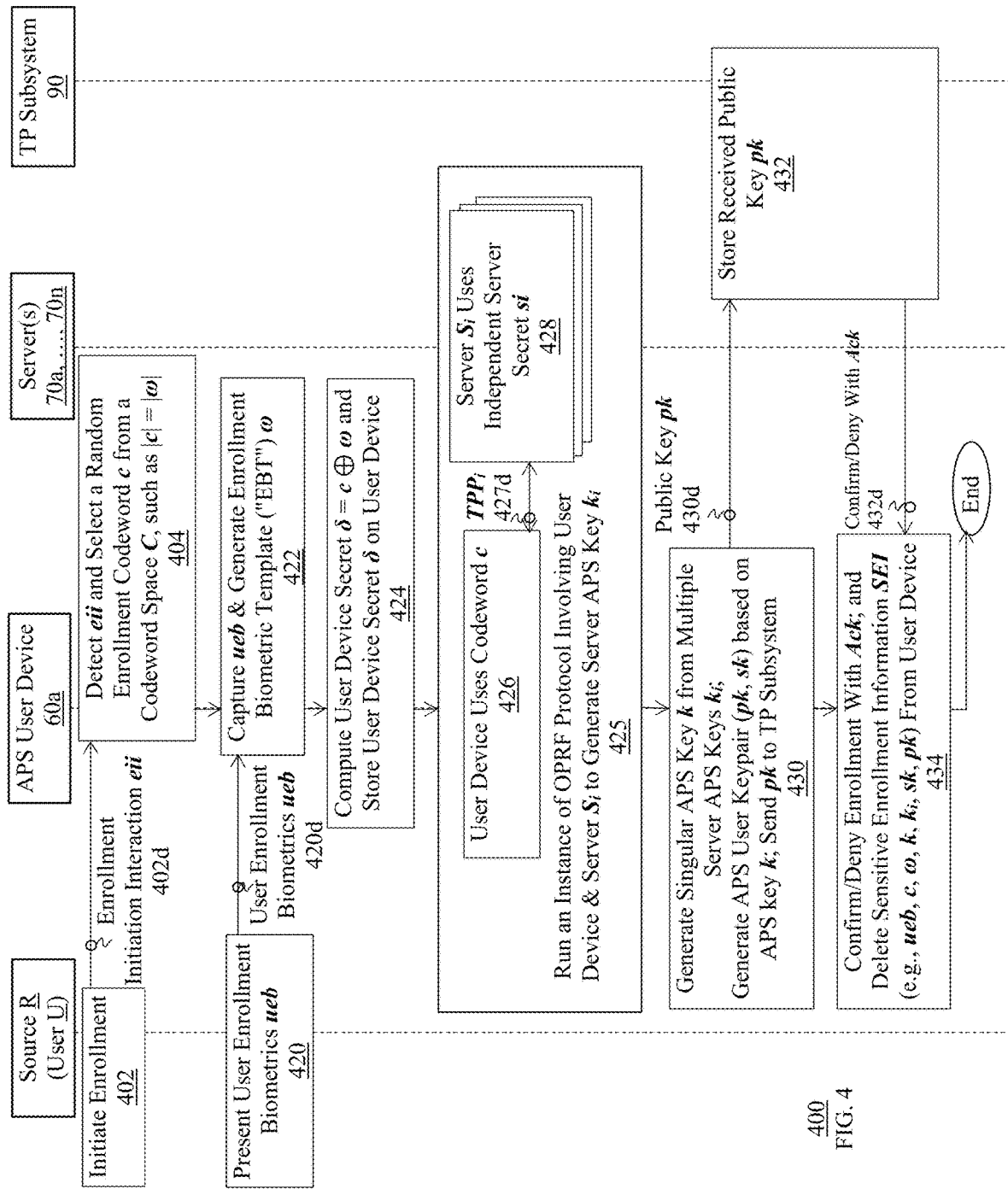
FIG. 4 illustrates a flowchart of an exemplary process for enrolling a user device and a user thereof with an APS platform, according to at least some embodiments.
Figure 5:
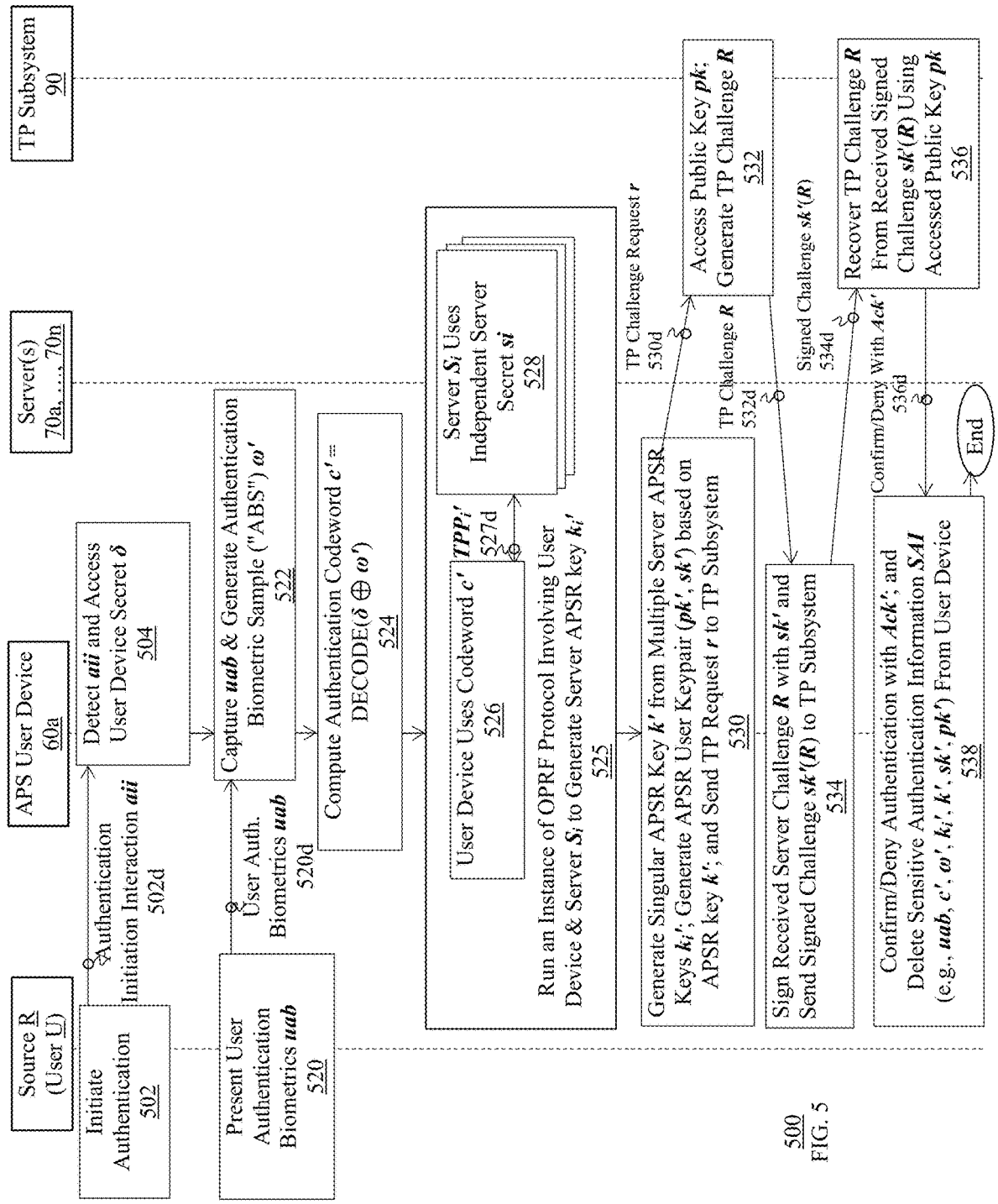
FIG. 5 illustrates a flowchart of an exemplary process for authenticating an enrolled APS user of an enrolled APS user device with an APS platform, according to at least some embodiments.
Figure 6:
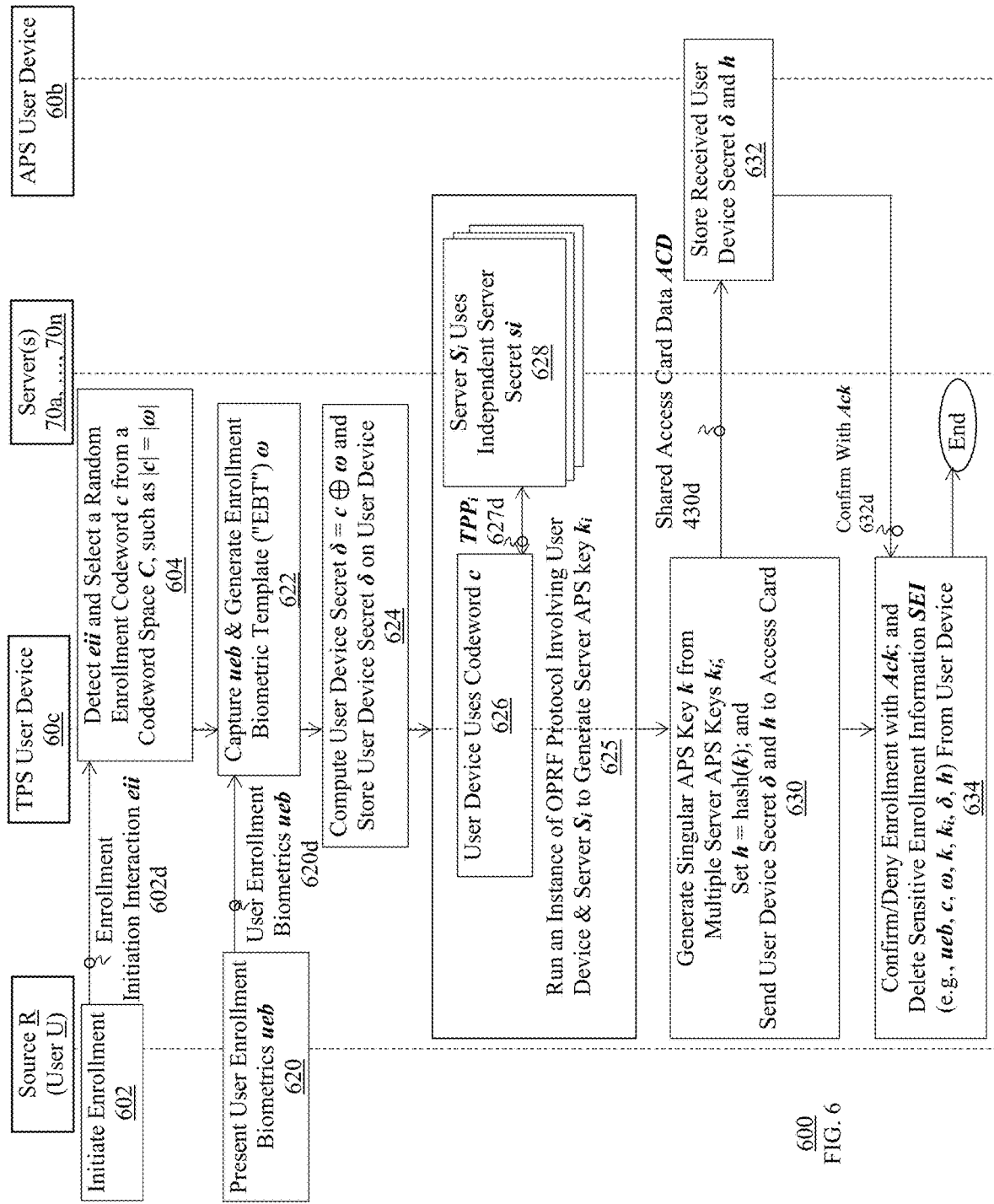
FIG. 6 illustrates a flowchart of another exemplary process for enrolling a user device and a user thereof with an APS platform, according to at least some embodiments.
Figure 7:
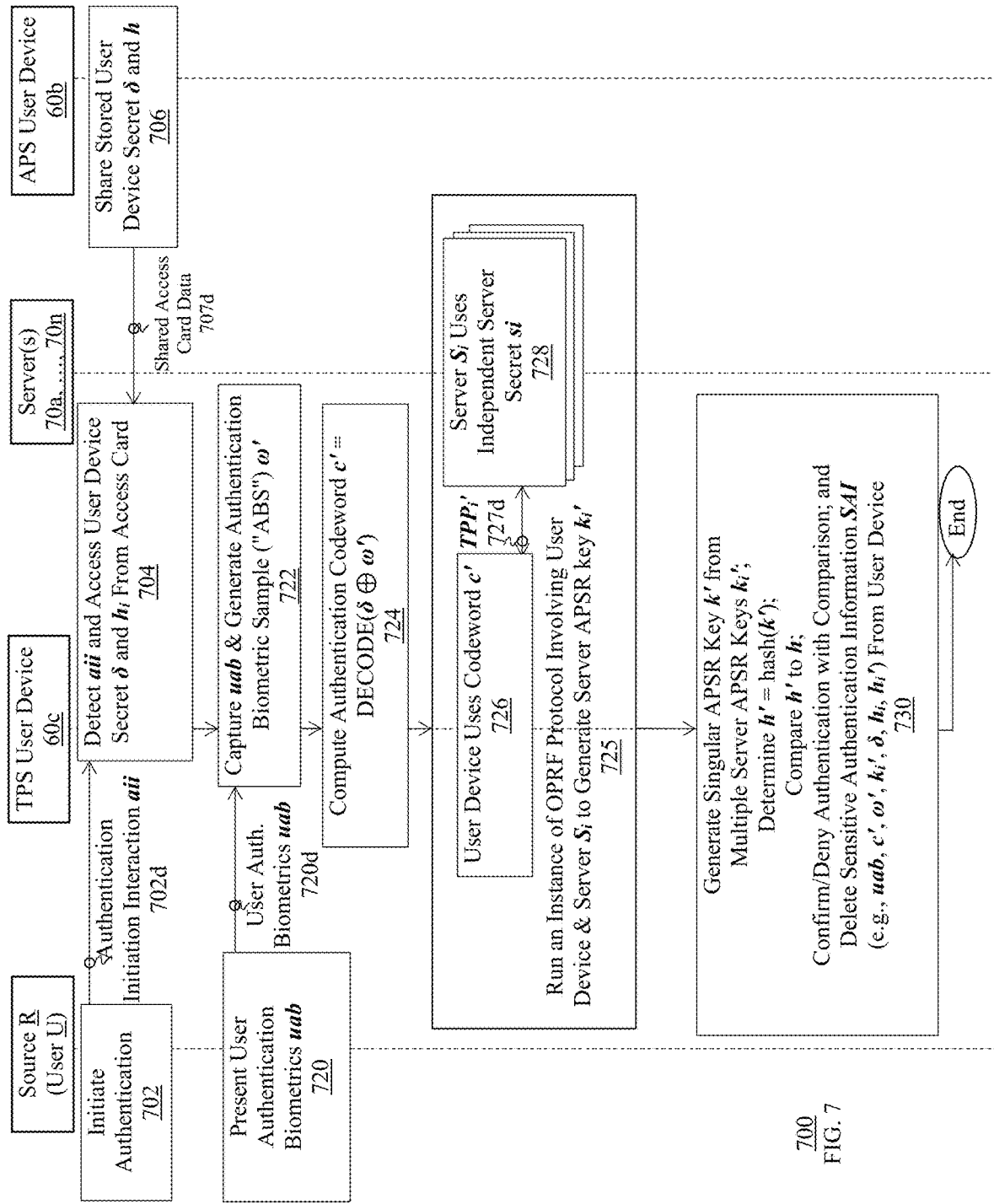
FIG. 7 illustrates a flowchart of another exemplary process for authenticating an enrolled APS user of an enrolled APS user device with an APS platform, according to at least some embodiments.
Figure 8C:
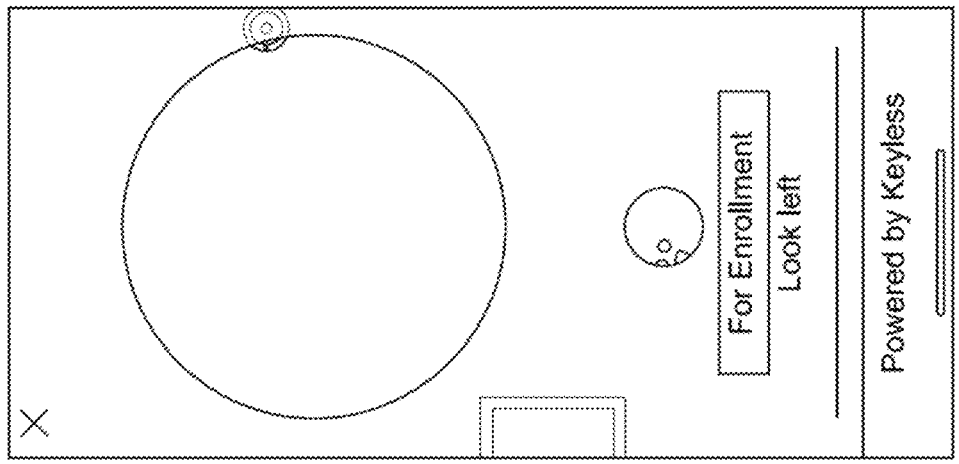
FIGS. 8A, 8B, 8C, 8D, 8E, 8F, 8G, 8H, and 8I illustrate exemplary screens of graphical user interfaces ("UIs") of one or more user devices carrying out an enrollment process of an APS platform, according to at least some embodiments.
Figure 8B:
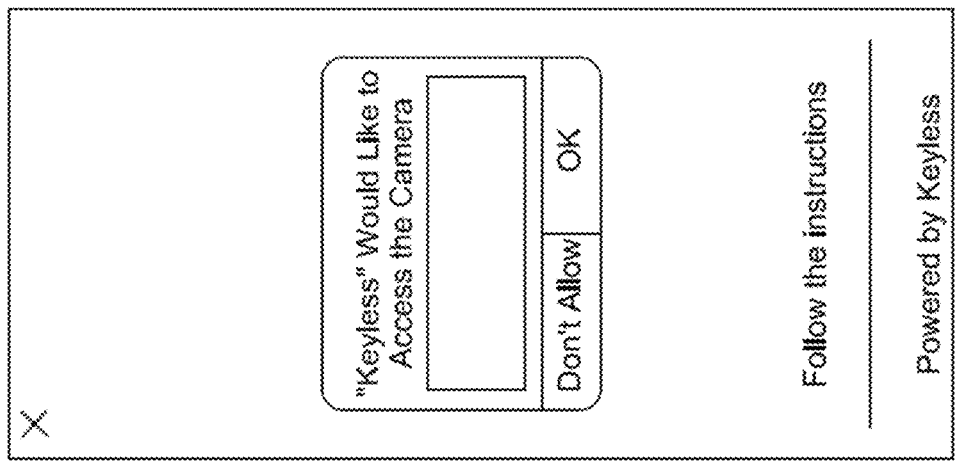
Figure 8A:
Figure 8F:
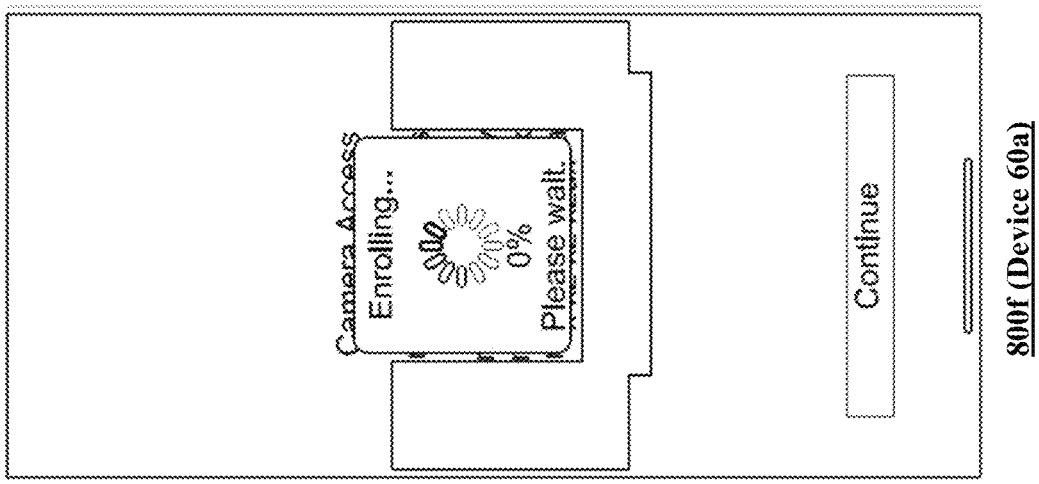
Figure 8E:
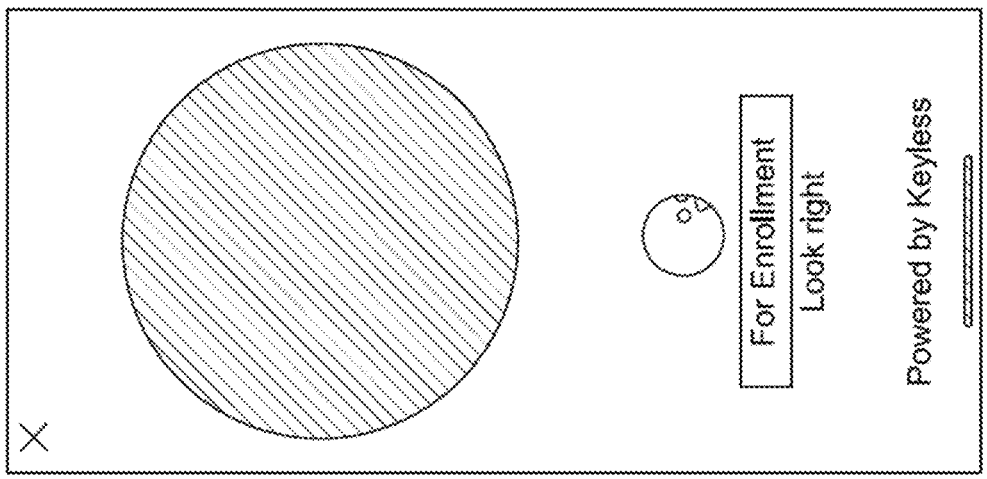
Figure 8D:
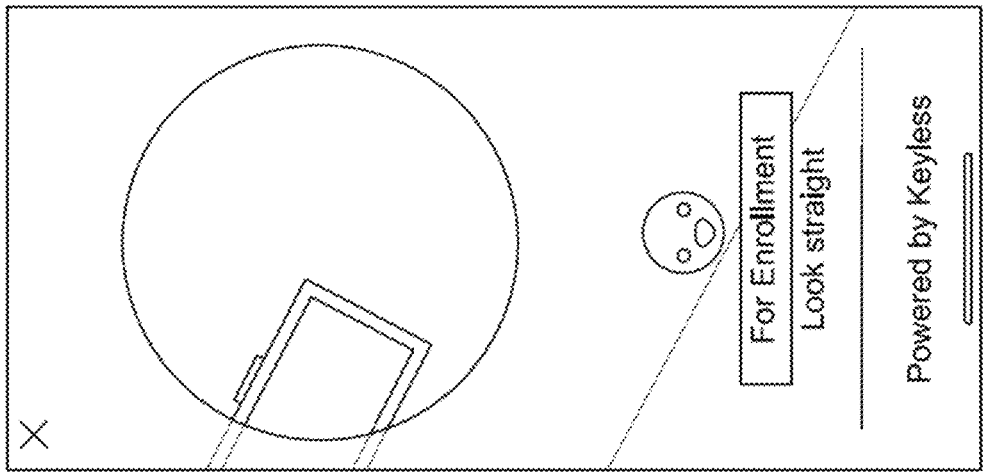
Figure 8I:
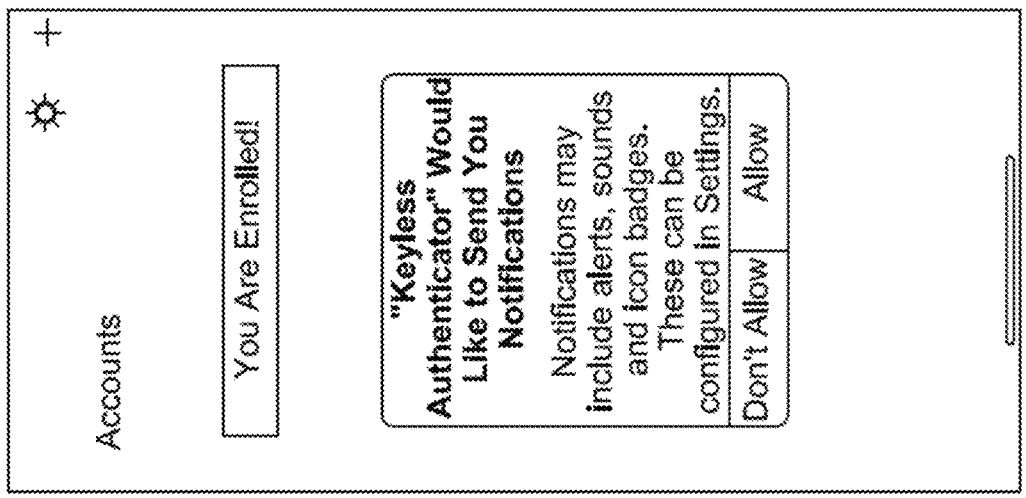
Figure 8H:
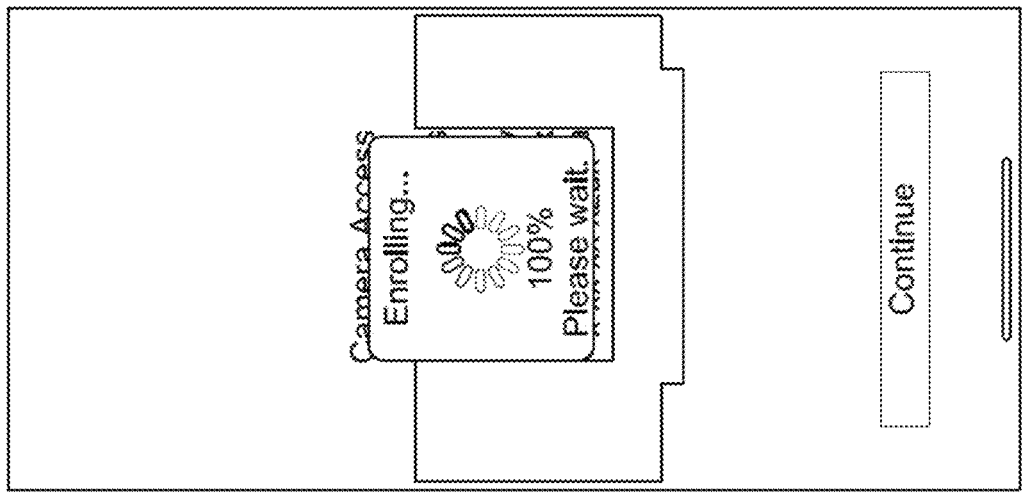
Figure 8G:
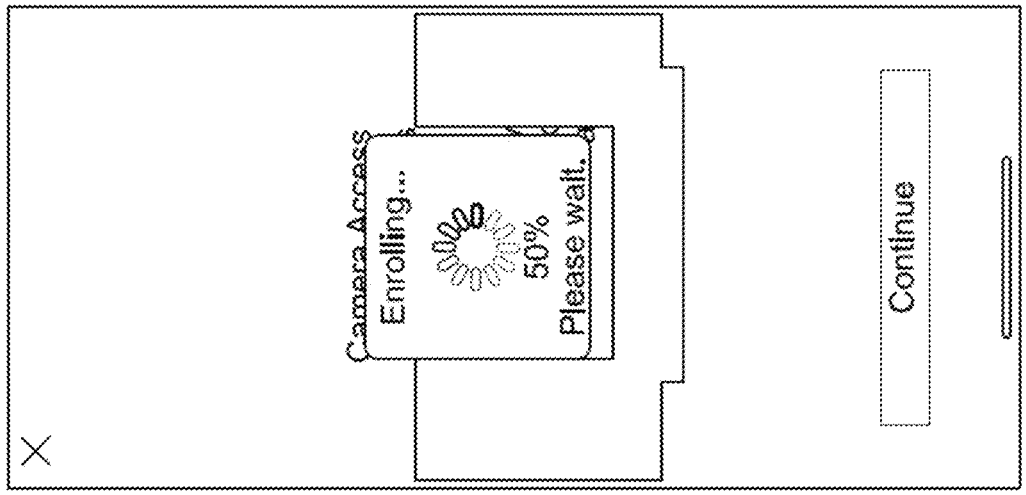

Various processes may be carried out in order for a user of a user device to be enrolled and authenticated by the APSP for executing any suitable secure operation (e.g., for securely accessing a third party website or app), including, but not limited to, processes 400-700 of FIGS. 4-7. FIG. 4 illustrates a flowchart of an exemplary process 400 for enrolling an APS user device and a user thereof with an APSP. FIG. 5 illustrates a flowchart of an exemplary process 500 for authenticating an enrolled APS user of an enrolled APS user device with an APSP. FIG. 6 illustrates a flowchart of another exemplary process 600 for enrolling an APS user device and a user thereof with an APSP. FIG. 7 illustrates a flowchart of another exemplary process 700 for authenticating an enrolled APS user of an enrolled APS user device with an APSP. FIGS. 8A-8I illustrate exemplary screens 800a-800i of graphical user interfaces ("UIs") of one or more user devices carrying out an enrollment process (e.g., each UI may be presented by any suitable I/O component 66 of any suitable user device 60a during process 400 of FIG. 4). Each UI of FIGS. 8A-8I may be a graphical user interface ("GUI") that may include various layers, windows, screens, templates, elements (e.g., buttons, sliders, labels, status bars, etc.), menus, and/or other components of a currently running application (e.g., application 69) that may be displayed by any suitable display of the device's I/O component. Additionally or alternatively, for a running application, various other types of non-visual information may be provided to a user as various other types of a UI via various other output components of the user device (e.g., audible, tactile, etc.). The operations of the processes described may be achieved with a wide variety of graphical elements and visual schemes. Therefore, the embodiments of FIGS. 8A-8I are not intended to be limited to the precise user interface conventions adopted herein. Rather, embodiments may include a wide variety of user interface styles, including non-graphical or otherwise non-visual interface styles.

FIG. 4 and FIGS. 8A-8I

FIG. 4 illustrates a flowchart of exemplary process 400 for enrolling an APS user device and a user thereof with the APSP. Process 400 is shown being implemented by APS user device 60a, its user U, a selection of servers or nodes 70 (e.g., a number n of selected nodes 70 (e.g., nodes 70a, 70b, 70c, . . . , 70n)), and any suitable third party ("TP") subsystem 90. However, process 400 may be implemented using any other suitable components or subsystems or entities of system 1 of FIG. 1 or otherwise. For example, as shown by the particular example of FIG. 4, process 400 may be implemented by a system similar to system 201 of FIG. 2, where sensor(s) (e.g., sensor 65) incorporated into device 60a may be used for capturing user enrollment biometrics ueb, although any other configuration may be possible for carrying out the concepts of process 400. Process 400 may provide a seamless user experience for securely and efficiently enrolling user U and its user device 60a with the APSP (e.g., a service of TP subsystem 90). To facilitate the following discussion regarding the operation of system 1 for enrolling user U and its user device 60a with the APSP according to process 400 of FIG. 4, reference is made to various components of system 1 of the schematic diagrams of FIGS. 1-1D, and to screens 800a-800i that may be representative of a graphical user interface of APS user device 60a during such a process (e.g., as shown in FIGS. 8A-8I). The operations described may be achieved with a wide variety of graphical elements and visual schemes. Therefore, the embodiments of FIGS. 8A-8I are not intended to be limited to the precise user interface conventions adopted herein. Rather, embodiments may include a wide variety of user interface styles, including non-graphical or otherwise non-visual interface styles.

Process 400 may begin at operation 402, where user U may initiate enrollment by carrying out any suitable enrollment initiation interaction eii 402d with an APS application 69 that may be running on the user's APS user device 60a. For example, as shown by screen 800a of FIG. 8A, the UI of APS device 60a may present an "ENROLL" option for user U to select with its enrollment initiation interaction eii in order to proceed with process 400 for enrolling with the APSP. In advance of operation 402, APS application 69 may be accessed by device 60a in any suitable manner (e.g., as an app downloaded from APS subsystem 100 or any suitable app store or otherwise) and user U may carry out any suitable account set-up operations with respect to the application, although any set-up operations not shown may or may not be required.

At operation 404, APS user device 60a may detect such an enrollment initiation interaction eii and, in response to such detection, user device 60a select or otherwise obtain any suitable random enrollment codeword c from any suitable code space or codeword space C (i.e., c∈C) in any suitable manner (e.g., according to application 69). For example, given a codeword space C, user device 60a may be configured to pick an element from codeword space C uniformly at random as enrollment codeword c. For example, codeword space C can include a set of any suitable number of bitstrings that are all of the same length. The set of all possible codewords may be called the code space or codeword space. Device 60a may be configured to use any suitable randomness to select a random codeword from codeword space C as random enrollment codeword c (e.g., at operation 404). For example, the randomness used to select random enrollment codeword c may be obtained from an operating system (e.g., of device 60a) or from a cryptographic library. In some embodiments, a pseudo random number generator ("PRNG") may be used to generate the randomness that may be used for selecting random enrollment codeword c from codeword space C for carrying out the APS, as long as the PRNG is secure from a cryptographic sense. The enrollment codeword c may be generated on the APS user device (e.g., using the APS application that may be running on the APS user device), with or without any suitable piece(s) of randomness from one or more other sources, such as through asking one or more nodes or third party subsystem(s) for some randomness (e.g., when a user device may be limited in its ability to generate random data).

As shown, such determination of codespace C and random selection therefrom of enrollment codeword c of operation 404 can be done before any user biometrics ub may be sampled and/or before any suitable enrollment biometric template ω may be generated (e.g., at operation 422). Alternatively, such determination of codespace C and/or random selection therefrom of enrollment codeword c of operation 404 can be done after any user enrollment biometrics ueb may be sampled and/or after any suitable enrollment biometric template ω may be generated. However, such selection of enrollment codeword c (e.g., of operation 404) and such generation of enrollment biometric template ω (e.g., of operation 422) ought to be done before user device secret δ may be computed (e.g., at operation 424), as both enrollment codeword c and enrollment biometric template ω may be used to compute user device secret δ. The length of enrollment codeword c and the length of enrollment biometric template ω ought to be the same. Given that the length of enrollment biometric template ω may be fixed and known ahead of time (e.g., by application 69 (e.g., based on a particular type of enrollment initiated (e.g., if a user were to select facial recognition enrollment then a first length may be required by the APSP for the template, if a user were to select fingertip scan enrollment then a second length may be required by the APSP for the template, etc.))), a condition that |c|=|ω| may not dictate whether codeword space C and enrollment codeword c be determined/chosen before or after enrollment biometric template ω is generated. In some embodiments, codeword space C may be configured as a system parameter that may be determined for each different source of enrollment biometric template ω (e.g., for each type of user enrollment biometrics ueb) before the system is deployed. Alternatively, when enrollment biometric template ω may be generated prior to selection of enrollment codeword c, codeword space C may be generated or defined or otherwise selected based on the length of generated enrollment biometric template ω. As mentioned, codeword space C may be a system parameter, such that it may always be known to some or all of the user devices of the system.

User EBT ω and/or ABS ω' may generally not have sufficient min-entropy for generating cryptographic APS keys k with enough entropy to satisfy one or more criteria of the APSP. The amount of entropy (e.g., high entropy) that may be required by the APSP for an APS key k may vary based on situation, but may generally require fulfilling any suitable criteria for secure cryptographic keys. The APSP may be configured to determine what this required amount of entropy may be using any suitable heuristics, and different organizations may provide recommendations as to what it may be (e.g., the National Institute of Standards ("NIST") may provide guidance for security strength (e.g., the minimum number of bits of entropy)). For example, although any suitable characteristic may be used to distinguish between "high entropy" and "low entropy", in some embodiments, "high entropy" may correspond to at least 112 bits of entropy or at least 128 bits of entropy (e.g., more conservatively) or the like, while "low entropy" may correspond to less than 128 bits of entropy or less than 112 bits of entropy or the like, although this number will likely increase over time. In some embodiments, a particular entropy condition may be met by using the condition to define the size of a codespace to be used by the APSP. For example, if at least 128 bits of entropy is a condition for a particular use (e.g., for a particular enrollment/authentication via an APS k), then the size of codeword space C may be defined to include at least $2^{128}$ codewords, from which enrollment codeword c may be randomly selected to provide such entropy to the generation of APS key k. Therefore, for a given EBT ω, varying one or more characteristics of the codespace C (e.g., number of codewords in the codespace) and/or its use (e.g., random selection therefrom of a particular enrollment codeword c) may vary the entropy of APS key k to be generated for that EBT ω.

The enrollment and authentication processes of the APSP may enable the min-entropy of the generated APS key k to be higher than the min-entropy of the original signal ω, and may provide flexibility on the min-entropy of APS key k through the selection of the type(s) of error-correcting code that may be utilized by the APSP to determine the codeword space and codewords and decoding that may be utilized. The APSP may be configured to utilize any suitable error correction code or error correcting code ("ECC") to carry out the APS of this disclosure and selection of an ECC may be used to dictate a particular codeword space (e.g., the number of codewords in a codeword space, the length of each codeword in the codeword space, which bitstrings are codewords and which bitstrings are not codewords of a particular codespace, etc.) (e.g., as may be used at operation 404) and/or to dictate corresponding combining/decombining functions associated with codeword space C (e.g., as may be used at operations 424/524) and/or to dictate a corresponding DECODE function associated with codeword space C (e.g., as may be used at operation 524), where a DECODE(•) function may be a function that may map an arbitrary string of length |c| to an element of codeword space C, and/or to dictate how the DECODE(•) function of the APSP may work and/or to dictate an error decoding threshold τ associated with the function (e.g., how many bits may be flipped (e.g., between EBT and ABS) while still enabling reconstruction) may depend on the specific error-correcting code being used (e.g., as may be selected by any suitable application (e.g., 69) on the user device(s) carrying out the process(es)). A particular ECC may be selected based on the type of EBT ω that is to be used by the system, where the type or size of EBT ω may vary depending on the sensor(s) capturing the associated ueb and/or the type of ueb (e.g., fingerprint sensor(s), facial scan sensor(s), gait sensor(s), etc.), such that a first ECC may be used for a first type of EBT ω generated for a fingerprint ub, while a different second ECC may be used for a second type of EBT ω generated for a facial scan ub, and/or the like.

Once user device 60a is ready to enroll a user (e.g., before or after selecting enrollment codeword c), process 400 may advance to operation 420, where user U may present any suitable user enrollment biometrics ueb (e.g., as user enrollment biometric identifier information or user enrollment biometric information 420d) to user device 60a by carrying out any suitable user biometrics enrollment interaction with device 60a. APS user device 60a may be configured to capture such enrollment biometrics ueb for generating an enrollment biometric template ("EBT") ω at operation 422 (e.g., according to APS application 69 (e.g., different users may use different biometrics, different devices may use different sensors, different types of data may be captured in addition to biometrics (e.g., device environment data), and/or the set of characteristics and associated actions themselves may change from one enrollment to the next, etc.)). For example, as shown by screen 800b of FIG. 8B, the UI of APS device 60a may optionally present a user approval request for accessing any suitable sensor(s) or other device components (e.g., a camera of device 60a) for capturing user biometrics, a request which the user may accept or deny. If accepted or automatically allowed, the UI of APS device 60a may present instructions on how the user ought to present user enrollment biometrics ueb to user device 60a for capture. For example, as shown by one or more of screens 800c-800e of FIGS. 8C-8E, while the user's face (not shown) may be in the line of sight of a device camera sensor, device 60a may instruct the user to look left, then eventually look straight at the camera, and then eventually look right. This may enable device 60a to capture user enrollment biometrics ueb in the form of a video or photograph sequence of the user's face rotating. This may enable "liveness" detection of the user (e.g., as may instructing the user to carry out any other suitable action while biometrics are captured, such as winking with one eye then with the other eye, or smiling then frowning, or saying a word or phrase, etc.). This may help prevent spoofing and/or capturing biometrics of an unwilling user.

Any suitable biometrics of a user may be captured in any suitable manner by any suitable sensor(s) of user device 60a in response to a user presenting itself to the user device in any suitable manner(s) at operation 420. For example, any information that may be sensed about the user by any sensor 65 described herein or otherwise may be used to define the user enrollment biometrics ueb to be captured by the user device 60a, including, but not limited to, facial information, fingerprint information, iris information, retinal scan information, movement, orientation, gesture, gait, pausality, speech information, any suitable behavioral biometrics, sequenced DNA, the output of any physically unclonable function, and/or the like. Biometric traits may be physiological or behavioral characteristics that may uniquely identify a user. Because of the uniqueness of these traits, several authentication techniques based on biometric signals have been introduced, including with respect to biometrics modalities including fingerprints, face, iris, voice, speech, and keystroke dynamics. Biometrics may capture intrinsic characteristics of the user (e.g., something that the user is), thus removing the need for a user to memorize any secret (e.g., a password or PIN), or to possess a physical device (e.g., a hardware token or a smart card, although still possible). The experience may typically be more user-friendly than other modalities. Further, biometric authentication may generally be more secure than passwords, whereas the security of biometric authentication systems may be largely independent of the user's choices and behavior.

However, biometric signals may be somewhat noisy. For example, multiple measurements collected from the same user may tend to vary slightly due to several factors, including, but not limited to, sensor noise, changes in collection environment (e.g., environmental lighting when EBT is captured may be different than environmental lighting when ABS is captured), changes in collection sensors (e.g., device used to capture EBT may be different than device used to capture ABS), and natural variations in the physiological characteristic being sampled (e.g., user without beard to capture EBT different than user with beard to capture ABS). For instance, the image collected from a fingerprint may change between samples because of the amount of pressure of the finger on the sensor, the angle at which the finger touches the sensor, and skin dryness. Similarly, individual pixels of the images used for face authentication may be affected by lighting, the position of the user's face within the frame, presence of facial hair, and/or the like (e.g., the user may grow a beard between when its enrollment biometrics are captured for generating EBT ω and when its authentication biometrics are captured for generating ABS ω'). Therefore, because of this noise, the APSP may be configured not to directly compare or otherwise use raw biometric signals (e.g., pixels in a fingerprint image of a user's enrollment biometrics and pixels in a fingerprint image of a user's authentication biometrics). Instead, the APSP may be configured to extract relevant features from the raw signals (e.g., the relative location and the orientation of minutiae points in fingerprint images) and match or otherwise use these features using any suitable pattern recognition systems. For example, at operation 422, user device 60a may not only be configured to capture user enrollment biometrics ueb (e.g., raw biometric signals), but may also be configured to generate an enrollment biometric template ("EBT") ω based on such captured user enrollment biometrics ueb using any suitable techniques (e.g., according to application 69).

For example, if captured ueb is an image of the user's face, device 60a may be configured to perform a tight square crop containing the user's face, scale it to 160×160 pixels, and then feed the pre-processed image into a convolutional neural network (e.g., that may be run on device 60a) that may produce an embedding for constituting EBT ω for the user's captured ueb (e.g., for an image x, the embedding may be represented as $f(x) \in \mathbb{R}^d$, which may embed x into a d-dimensional Euclidean space. Therefore, in some embodiments, operation 422 may use a neural network or otherwise to process captured ueb into one or more vectors for defining EBT ω, such that the vector(s) of such an EBT ω may later be compared to vector(s) of an ABS ω' for computing a distance therebetween.

However, any suitable enrollment biometrics ueb may be used in any suitable manner to define any suitable enrollment biometric template ω (e.g., fingerprint biometrics ueb may be transferred into a set as EBT ω). Generally, data may be collected from any or all sensors of the user device and/or of any other suitable device of the APSP for any amount of time (e.g., while asking the user to cooperate or in the background without explicitly asking for the user's cooperation (e.g., when sensing the gait of a user that may be walking while carrying the device)), then a subset of the raw collected data may be selected based on any suitable data quality check(s), and then the raw data (e.g., subset or otherwise) may be processed using any suitable algorithms (e.g., legacy feature extraction, machine learning, etc.) and/or encoding of time-series information (e.g., for liveness checks (e.g., as may be distinct from snap-shot image data)). For example, this may reveal a set and/or vector and/or matrix and/or the like that may be used to define EBT ω, as any suitable representation (e.g., string of bits or digital representation) of the sensed data (e.g., user biometric data and/or device environmental data).

At operation 424, once EBT ω has been generated and enrollment codeword c has been obtained (e.g., EBT ω may be generated before or after or simultaneously with selection of enrollment codeword c), user device 60a may then compute or otherwise generate any suitable APS or enrollment trusted user device secret δ in any suitable manner using EBT ω and enrollment codeword c, and then such a trusted user device secret δ may be stored on user device 60a (e.g., in memory 63), although in other embodiments, trusted user device secret δ may be computed and stored at any other suitable moment while EBT ω and enrollment codeword c are available to device 60a (e.g., at any suitable moment between operation 422 and operation 434 (e.g., where EBT ω and enrollment codeword c may be deleted from user device 60a)). As an example, trusted user device secret δ may be computed as the bitwise exclusive (e.g., XOR) between EBT ω and enrollment codeword c (e.g., δ=ω⊕c), where that logical operation may be the combining scheme or combining function of the particular ECC being used by the APSP (e.g., the ECC used to generate enrollment codeword space C). However, it is to be understood that any other bitwise operation or any other suitable combining function or scheme may be carried out on the two strings to generate the device secret. Here, "bitwise XOR" may be a specific example of an operation over an alphabet with two symbols, "0" and "1" (e.g., where each of EBT ω and enrollment codeword c may be a string of 0s and 1s), and the operation may be considered "addition modulo 2." If EBT ω and enrollment codeword c used a larger alphabet with n symbols, then "addition modulo n" could be the combining operation that may replace "bitwise XOR." This may be considered less standard and would be meaningful for codes that may be referred to as "codes in Lee metric." Enrollment codeword c may be configured to have more entropy than the EBT. Therefore, by combining EBT ω with enrollment codeword c, more entropy may be achieved than with just the EBT alone (e.g., for creating trusted user device secret δ).

At operation 425, before or after trusted user device secret δ may be computed, but while enrollment codeword c is still available to device 60a (e.g., at any suitable moment between operation 404 and operation 434 (e.g., where enrollment codeword c may be deleted from user device 60a)), user device 60a and each of one or more servers S may work together using any suitable secure multi-party computation (e.g., using OPRF (e.g., according to application 69)) to generate a respective APS key k using enrollment codeword c of user device 60a and server secret s of the respective server S. Each node or server S to be utilized by the APSP may be configured to store its own suitable server secret s, where each one of servers $S_1$-$S_n$ may include its own distinct server secret $s_1$-$s_n$ (e.g., server $S_i$ may include its own server secret $s_i$). At an instance of operation 425 between user device 60a and a particular server node $S_i$ (e.g., a particular one of nodes 70), user device 60a may not disclose any of user enrollment biometrics ueb, EBT ω, enrollment codeword c, and trusted user device secret δ to server $S_i$ or to any other server, and server $S_i$ may not disclose its server secret $s_i$ to user device 60a or any other server. However, while EBT ω may be used by user device 60a in addition to enrollment codeword c for generating trusted user device secret δ, neither EBT ω nor trusted user device secret δ may be used by user device 60a for generating any APS key k at operation 425.

Oblivious pseudorandom function ("OPRF") is an example of a protocol for two parties that may be used as a suitable form of secure multiparty computation between user device 60a and a server $S_i$ for generating a respective server APS key $k_i$ (e.g., a high-entropy cryptographic key of the APSP) at operation 425 of process 400. As shown, user device 60a may use enrollment codeword c (e.g., at suboperation 426 of operation 425) and server $S_i$ may use its server secret $s_i$ (e.g., at suboperation 428 of operation 425) and where any suitable two-party protocol ("TPP") data $TPP_i$ data 427d may be communicated therebetween for carrying out operation 425 to generate server APS key $k_i$. Therefore, user device 60a may run an instance of the OPRF protocol with the server to learn APS key $k_i$, where APS key $k_i$ may equal $OPRFs_i(c)$. The OPRF protocol between server S and user device 60a for securely computing a pseudorandom function on server key or secret s contributed by server S and input enrollment codeword c contributed by user device 60a in such a way that user device 60a may learn only the value of the function on the secret using the codeword (e.g., $k_i=OPRFs_i(c)$) while the server learns nothing from the interaction (e.g., device 60a learns key $k_i$ but not also server secret while server $S_i$ learns neither key $k_i$ nor codeword c. As just one example, operation 425 may include user device 60a encrypting enrollment codeword c (e.g., its input) using a random key with a deterministic commutative encryption scheme (e.g., a scheme where a message m encrypted under multiple keys can be decrypted using the corresponding decryption keys in any order (i.e., $D_{k1}(D_{k2}(E_{k1}(E_{k2}(m))))=D_{k2}(D_{k1}(E_{k1}(E_{k2}(m))))=m$)). Continuing with such an example, server $S_i$ may be configured to encrypt such a ciphertext from user device 60a (e.g., received as first data 427d from user device 60a) using the same scheme and that server's server secret $s_i$ as the key. Then, user device 60a may be configured to decrypt such a new ciphertext from server $S_i$ (e.g., received as second data 427d from server $S_i$) using its decryption key and may hash the result for defining APS key $k_i$. Such encryption and decryption schemes of the OPRF may be defined by the APSP and utilized by user device 60a and each server S for enabling the APS of the system. The OPRF may not add additional entropy on top of the randomness that is already included in the selection of enrollment codeword c of codeword space C in order to generate high-entropy cryptographic key k.

Therefore, a high-entropy cryptographic key $k_i$ may be generated at operation 425 using enrollment codeword c and a server secret s. Key $k_i$ may have higher entropy than user enrollment biometrics ueb and/or EBT ω. (e.g., through use of codeword c and at least one server node).

Once a high-entropy cryptographic APS key $k_i$ has been generated by user device 60a with its enrollment codeword c through use of an OPRF and a server secret $s_i$ of a server $S_i$, that APS key $k_i$ may be used in any suitable manner for enrolling the user/user device with the APSP (e.g., with TP subsystem 90). Process 400 may include one iteration of operation 425 with a single server $S_i$ for generating a single server APS key in which case that single server APS key $k_i$ may be used as APS key k for the remainder of process 400. Alternatively, process 400 may include m iterations of operation 425 with m server $S_1$-$S_m$ for generating m-server APS keys $k_1$-$k_m$, in which case those m-server APS keys $k_1$-$k_m$ may be used by APS device 60a to generate a singular APS key k for the remainder of process 400. For example, at operation 430 of process 400, the APS may be configured to generate singular APS key k from one or multiple server APS keys $k_1$-$k_m$ using any suitable technique (e.g., any suitable multi-key polynomial interpolation algorithm(s)). The APS protocol may be configured to use a threshold secret sharing scheme to mitigate attacks that involve compromising a (possibly large) subset of the network nodes. APS application 69 may be configured to select the set of nodes m from network 40 randomly or based on any suitable enterprise policies. For example, certain policies can be pre-defined before the instantiation of the protocol. If needed, the policies can also be updated and correspondingly the user can interact with a new set of nodes in the network after the policy update. A node may be chosen based on its response time, but other selection policies are also appropriate. While the minimum number of nodes n may be 1, this number provides no redundancy and no ability to use secret sharing or distributing shares of a secret. A more typical minimum number of nodes n may be 3, where the number of nodes m to be n or n–1 or the like, or any other suitable number.

Then, once APS key k has been defined (e.g., as the sole server APS key $k_i$, or some suitable combination of multiple server APS keys $k_1$-$k_m$), that APS key k may be used to generate any suitable enrollment payload data (e.g., an APS user keypair, a key hash, etc.), at least part of which (e.g., a public key of a key pair, the key hash, etc.) may be used to enroll the user/device with the APSP. For example, at operation 430 of process 400, user device 60a may generate any suitable APS user keypair (pk, sk) using APS key k and then send public key pk of that APS user keypair (e.g., as data 430d) for storage on any suitable TP subsystem 90 (e.g., at operation 432 (e.g., that public key pk may be stored by TP subsystem 90 in such a manner that it may be associated with any suitable public identifier of user device 60a for future use in association with user device 60a)), such that TP subsystem 90 may use that public key pk for any suitable future authentication process associated with user U and/or user device 60a (e.g., at operation 536 of process 500 of FIG. 5). Once receipt and storage of such a public key pk based on APS key k may be confirmed by TP subsystem 90 to user device 60a with a confirmed acknowledgement (e.g., with data 432d), user device 60a may delete any sensitive enrollment information ("SEI") from user device 60a and confirm or deny enrollment based on the success or failure of the acknowledgment (e.g., at operation 434) and end process 400. Such SEI may include any suitable data, including, but not limited to, user enrollment biometrics ueb (e.g., as captured at operation 422), EBT ω (e.g., as generated at operation 422), enrollment codeword c (e.g., as obtained at operation 404), any server APS keys $k_i$ (e.g., as generated at operation 425), singular APS key k (e.g., as generated at operation 430), private key sk of an APS user keypair (e.g., as generated at operation 430) if not also public key pk of the APS user keypair (e.g., as generated at operation 430), and/or the like, while retaining trusted user device secret δ (e.g., as computed at operation 424). Therefore, at the end of process 400, user device 60a may have gained knowledge of trusted user device secret δ and TP subsystem 90 may have gained knowledge of public key pk of an APS user keypair, while each server may not have gained any useful information.

As mentioned, at operation 430, user device 60a may derive or otherwise generate one or more keys and/or one or more key pairs (e.g., according to application 69) based on high-entropy cryptographic APS key k. For example, user device 60a may obtain APS key k using enrollment codeword c and then use that APS key k and codeword c to generate a private user key sk, such as by defining private user key sk=$HMAC_c(k)$. For such a hash-based message authentication code ("HMAC"), the APSP may use HMAC-SHA256, but, in other embodiments, HMAC could be instantiated with other collision-resistant hash functions without impacting the security of the protocol. Further, HMAC can be replaced by any suitable pseudorandom function family ("PRF") (e.g., any suitable efficiently-computable function of the PRF), where private user key sk may be generated using any PRF computed over APS key k and enrollment codeword c. Alternatively, the APSP may use $HMAC_c(k)$ as a source of randomness for any suitable key generation algorithm (e.g., an elliptic curve digital signature algorithm ("ECDSA")) that may be used to generate private user key sk. A counterpart public user key pk to private user key sk may also be generated at operation 430 in any suitable manner (e.g., for providing APS user keypair (sk, pk)). For example, private user key sk may be used as a private key for an ECDSA, and the corresponding public counterpart is public user key pk (e.g., pk=sk×G, where G may be the elliptic curve base point). Therefore, APS user keypair (sk, pk) may be deterministically generated from APS key k. In some embodiments, enrollment codeword c may not be utilized at operation 430 and private APS user key sk may be defined using APS key k but not also codeword c. In some embodiments, private APS user key sk may be defined as APS key k. A public/private cryptosystem may come with a key generation process, and the key generation process may require some randomness. For example, a suitable public/private cryptosystem may be selected, and the corresponding key generation process of the selected cryptosystem may be used to obtain private APS user key sk and public user key pk, where APS key k or some transformation of APS key k may be used as the source of randomness for that key generation process. In some embodiments private APS user key sk may be used as a private key for an Edwards-curve digital signature algorithm ("EdDSA") or an ECDSA, and the corresponding public counterpart is public APS user key pk (e.g., pk=sk×G, where G may be the elliptic curve base point). Such an APS user keypair may be used to authenticate a user device through a randomized challenge-response protocol based on a zero-knowledge proof of knowledge. At operation 430, APS device 60a may send public APS user key pk as data 430d to TP subsystem 90 of system 1 (e.g., according to application 69).

At operation 432, TP subsystem 90 may receive data 430d from user device 60a and store (e.g., according to application 99 of that particular TP subsystem 90) the public APS user key pk and any other suitable information of data 430d (e.g., key pk and any suitable public information indicative of the identify of user device 60a may be stored together (e.g., in a linked fashion) as a portion of TP APSP data 99d in memory 93 of the TP subsystem 90) for enrolling user device 60a and its user U with the TP subsystem 90. In some embodiments, TP subsystem 90 may send the stored APS public key pk of user device 60a to any suitable repository or third party subsystem for future use. TP subsystem 90 may generate an enrollment verification acknowledgment Ack that may be indicative of that TP subsystem 90 fully enrolling user device 60a with the stored public APS user key pk of user device 60a, and then TP subsystem 90 may send that verification acknowledgment Ack as at least a portion of data 432d back to user device 60a (e.g., according to application 99 of that particular TP subsystem 90). At operation 434, user device 60a may receive and register verification acknowledgment Ack of data 432d from TP subsystem 90 for each public APS user key pk (e.g., according to application 69 of user device 60a). If the received Ack is indicative of a positive verification by TP subsystem 90 for a particular public APS user key pk, then user device 60a may determine that its public APS user key pk has been stored by that TP subsystem 90, and that its public APS user key pk has been stored on a repository (if appropriate), whereby user device 60a may be enabled to end the enrollment process 400. Ending enrollment process 400 may include confirming that no sensitive enrollment information SEI remains on device 60a. This may include deleting any or each of the following items of information SEI of each applicable node i and/or for the entire enrollment process: user enrollment biometrics ueb of the enrollment process, enrollment codeword c of the enrollment process, EBT $\omega$ of the enrollment process, each server APS key $k_i$ of the enrollment process, singular APS key k, private APS user key sk of the enrollment process, and public APS user key pk of the enrollment process. This deletion of sensitive enrollment information SEI (e.g., at operation 434) from user device 60a during this enrollment process may prevent such information from being accessed by device 60a if device 60a were somehow compromised after enrollment. Moreover, certain information, even before deletion, may never be provided to certain portions of memory 63 of user device 60a. For example, an APSP SDK of the client APS application 69 of user device 60a may retain at least codeword c and EBT $\omega$ and/or any other suitable data of the SEI inside the APSP SDK and not allow such data to be provided to other portions of the APS application 69 and/or to other applications of device 60a. The APSP SDK may be configured never to save such data to a permanent storage of device memory 63 (e.g., a flash memory portion of memory 63), but only in device volatile memory or otherwise of device memory 63 (e.g., a RAM portion of memory 63), and may be configured to overwrite such data with zeroes or otherwise delete such data (e.g., overwrite with 0's then overwrite with 1's then overwrite with random data) once the values are no longer necessary for the enrollment process (e.g., at operation 434). Ending enrollment process 400 may also include storing trusted user device secret $\delta$ on enrolled user device 60a (e.g., as a portion of data 69d (e.g., in permanent storage (e.g., a flash memory portion of memory 63))) for later retrieval (e.g., at operation 504 of process 500). Some of the keys generated at operation 430 (e.g., public APS user key pk (but not private APS user key sk of deleted sensitive enrollment information SEI) may also be stored on enrolled user device 60a (e.g., as a portion of data 69d (e.g., in permanent storage (e.g., a flash memory portion of memory 63))) before ending enrollment process 400. As shown, screens 800f-800h of FIGS. 8F-8H may be provided by application 69 of user device 60a during such enrollment, but screen 800i of FIG. 8I may be presented when such enrollment is complete and confirmed (e.g., after operation 434), at which time a user may be presented with any suitable enrolled options (e.g., whether or not to enable push notifications from the APSP on the enrolled device). However, if the received Ack is indicative of a negative verification by TP subsystem 90 for a particular public APS user key pk, then user device 60a may determine that its public APS user key pk may not have been stored by TP subsystem 90 and/or on a repository (if appropriate), whereby user device 60a may be configured to repeat one or more of operations 404-430 (e.g., after deleting the appropriate SET) for at least each TP subsystem 90 that provided such a negative verification. In some embodiments of a repository (e.g., as a public blockchain), a user device may be able to independently verify if a public APS user key pk has been published to the repository.

The operations shown in process 400 of FIG. 4 are only illustrative and it is understood that existing operations may be modified or omitted, additional operations may be added, and the order of certain operations may be altered. Much of enrollment process 400 may be carried out transparently to user U for providing a more seamless and efficient user experience. For example, operation 404 may be transparent to user U (e.g., between being presented with screen 800a of FIG. 8A and being presented with screen 800b of FIG. 8B). As another example, operations 422-434, including the entirety of two or more iterations of operation 425 for two or more server nodes, may be transparent to user U (e.g., between being presented with screen 800f of FIG. 8F and being presented with screen 800i of FIG. 8I).

FIG. 5

Various processes may be carried out in order for a user of a user device to be authenticated by the APSP for executing any suitable secure operation (e.g., for securely accessing a third party website or app (e.g., of TP subsystem 90)), including, but not limited to, processes 500 of FIG. 5. For example, FIG. 5 illustrates a flowchart of exemplary process 500 for authenticating an enrolled APS user of an enrolled APS user device with the APSP. Process 500 is shown being implemented by APS user device 60a, its user U, a selection of servers or nodes 70 (e.g., a number n of selected nodes 70 (e.g., nodes 70a, 70b, 70c, . . . , 70n)), and TP subsystem 90. However, process 500 may be implemented using any other suitable components or subsystems or entities of system 1 of FIG. 1 or otherwise. For example, as shown by the particular example of FIG. 5, process 500 may be implemented by a system similar to system 201 of FIG. 2, where sensor(s) (e.g., sensor 65) incorporated into device 60a may be used for capturing user authentication biometrics uab, although any other configuration may be possible for carrying out the concepts of process 500. Process 500 may provide a seamless user experience for securely and efficiently authenticating with the APSP an enrolled APS user U and its enrolled APS user device 60a (e.g., as enrolled by process 400). To facilitate the following discussion regarding the operation of system 1 for authenticating user U and its user device 60a with the APSP (e.g., with TP subsystem 90) according to process 500 of FIG. 5, reference is made to various components of system 1 of the schematic diagrams of FIGS. 1-1D.

Process 500 may begin at operation 502, where user U may initiate enrollment by carrying out any suitable authentication initiation interaction aii 502d with an APS application 69 that may be running on the user's enrolled APS user device 60a (e.g., a device that has been enrolled with the APSP (e.g., via process 400)). For example, any suitable UI of APS device 60a may present selectable options "[YES]" and "[NO]" associated with a request to authenticate, and the user may be enabled to select one of the options with its authentication initiation interaction aii in order to proceed with process 500 for authentication with the APSP. Such an authentication option presentation may be provided as a push notification (e.g., as may have been accepted by the user at screen 800i of an enrollment process) in response to the user device receiving any suitable request or challenge for enabling a particular secure operation that may be facilitated through authentication with the APSP. In advance of operation 502, APS application 69 may be accessed by device 60a in any suitable manner (e.g., as an app downloaded from APS subsystem 100 or any suitable app store or otherwise) and user U may first enroll itself and the device with the APSP (e.g., via process 400 of FIG. 4).

At operation 504, APS user device 60a may detect an affirmative authentication initiation interaction aii (e.g., an interaction indicative of an interest in initiating authentication) and, in response to such detection, user device 60a may access certain data associated with the earlier device enrollment, including trusted user device secret δ (e.g., as may be stored in memory 63 of device 60a (e.g., at operation 424 of process 400)). This data may then be used (e.g., during operation 524) to authenticate device 60a with the node(s) of the APSP.

Once user device 60a is ready to authenticate a user (e.g., before or after accessing trusted user device secret δ), process 500 may advance to operation 520, where user U may present any suitable user authentication biometrics uab (e.g., as user authentication biometric identifier information or user authentication biometric information 520d) to user device 60a by carrying out any suitable user biometrics authentication interaction with device 60a, which may be configured to capture such authentication biometrics uab for generating an authentication biometric sample ("ABS") ω' at operation 522 (e.g., according to APS application 69). For example, the UI of APS device 60a may present instructions on how the user ought to present user authentication biometrics uab to user device 60a for capture (e.g., similarly to as shown by one or more of screens 800c-800e of FIGS. 8C-8E with respect to enrollment biometrics capture). This may enable device 60a to capture user authentication biometrics uab in the form of a video or photograph sequence of the user's face rotating. This may enable "liveness" detection of the user (e.g., as may instructing the user to carry out any other suitable action while biometrics are captured, such as winking with one eye then with the other eye, or smiling then frowning, or saying a word or phrase, etc.). This may help prevent spoofing and/or capturing biometrics of an unwilling user. Just as any suitable enrollment biometrics ueb of a user may be captured in any suitable manner(s) by any suitable sensor(s) of user device 60a at operation 422 in response to a user presenting itself to the user device in any suitable manner(s) at operation 420 of enrollment process 400, any suitable authentication biometrics uab of a user may be captured in any suitable manner(s) by any suitable sensor(s) of user device 60a at operation 522 in response to a user presenting itself to the user device in any suitable manner(s) at operation 520 of authentication process 500 (e.g., according to an APS application of the APS user device). Moreover, just as any suitable EBT ω may be generated in any suitable manner(s) using any suitable enrollment biometrics ueb at operation 422 of enrollment process 400, any suitable ABS ω' may be generated in any suitable manner(s) using any suitable authentication biometrics uab at operation 522 of authentication process 500 (e.g., according to an APS application of the APS user device). As mentioned, operation 422 may use any suitable neural network(s) to process captured ueb for defining EBT ω. Similarly, operation 522 may use any suitable neural network(s) to process captured uab for defining ABS ω', where such neural network(s) used at operation 522 may be the same as or different than the neural network(s) used at operation 422. However, the manner in which enrollment biometrics are captured may differ in any suitable way(s) from the manner in which the authentication biometrics are captured (e.g., the amount of information captured (e.g., the quality or resolution of the capture) may be less for the ABS than for the EBT). For example, this may help ensure high quality of an enrollment template and, as such, less false rejects and false accepts during authentications, while the differences can include, but are not limited to, amount of data captured, possible additional/different collaboration from the user, possible quality checks and repeated capture of data, other processing techniques, and/or the like.

At operation 524, once ABS ω' has been generated and enrollment user device secret δ has been obtained (e.g., ABS ω' may be generated before or after or simultaneously with access of enrollment user device secret δ), user device 60a may then attempt to reconstruct enrollment codeword c by computing or otherwise generating an authentication codeword c' in any suitable manner using ABS ω' and user device secret δ. For example, APS user device 60a may utilize a DECODE(•) function of the ECC being employed by the APSP (e.g., the decoding function associated with codeword space C utilized by the APSP to select enrollment codeword c) in order to compute authentication codeword c' by decoding a decombination of ABS ω' and user device secret δ (e.g., c'=δ⊕ω'). For example, while the decombination of operation 524 may be an XOR similar to the combination of operation 424, the associated combination and decombination functions of the ECC may not necessarily be the same function. For example, any other suitable bitwise operation may be carried out on the two strings ABS ω' and user device secret δ other than one related to bitwise XOR. Authentication codeword c' (e.g., an attempted reconstruction of enrollment codeword c) may be the result of the DECODE (•) function of the ECC on the result of the decombination of ABS ω' and user device secret δ.

At operation 525, while authentication codeword c' from operation 524 is still available to device 60a, user device 60a and each of one or more servers $S_i$ may work together using any suitable secure multi-party computation (e.g., using OPRF (e.g., according to application 69)) to generate a respective server APSR key $k_i'$ (e.g., a reconstruction of a server APS key $k_i$) using authentication codeword c' of user device 60a (e.g., a reconstruction of codeword c) and server secrets of the respective server S. Each node or server S to be utilized by the APSP may be configured to store its own suitable server secret s, where each one of servers $S_1$-$S_n$ may include its own distinct server secret $s_1$-$s_n$ (e.g., server $S_i$ may include its own server secret $s_i$), where such a server secret s may be the same as used by that server during operation 425 of process 400. At an instance of operation 525 between user device 60a and a particular server node $S_i$, (e.g., a particular one of nodes 70), user device 60a may not disclose any of user authentication biometrics uab, ABS ω', authentication codeword c', and trusted user device secret δ to server $S_i$ or to any other server, and server $S_i$ may not disclose its server secret $s_i$ to user device 60a or any other server. However, while ABS ω' may be used by user device 60a in addition to trusted user device secret δ for generating authentication codeword c', neither ABS ω' nor trusted user device secret δ may be used by user device 60a for generating any APSR key k' at operation 525.

Like operation 425 of enrollment process 400, OPRF is an example of a protocol for two parties that may be used as a suitable form of secure multiparty computation between user device 60a and a server $S_i$ for generating a respective APSR key $k_i'$ (e.g., a high-entropy cryptographic key of the APSP) at operation 525 of authentication process 500. As shown, user device 60a may use authentication codeword c' (e.g., at suboperation 526 of operation 525) and server $S_i$ may use its server secret $s_i$ (e.g., at suboperation 528 of operation 525) and where any suitable two-party protocol ("TPP") data TPP$_i$ data 527d may be communicated therebetween for carrying out operation 525 to generate APSR key $k_i'$. Therefore, user device 60a may run an instance of the OPRF protocol with the server to learn APSR key $k_i'$, where APSR key $k_i'$ may equal OPRFs$_i$(c'). Therefore, operation 525 of process 500 may be the same as operation 425 of process 400 but with the use of authentication codeword c' rather than with the use of enrollment codeword c. For example, to reconstruct high-entropy cryptographic APS key $k_i$ as high-entropy cryptographic APSR key $k_i'$ during authentication, user device 60a and server $S_i$ may run a similar protocol to that used during enrollment, where, after user device 60a samples ABS ω' and computes authentication codeword c' with ABS ω' and trusted user device secret δ using decoding function DECODE(•) (e.g., the decoding function associated with the ECC and codeword space C of the APSP). When D(•) may be defined as the distance function associated with the codewords of codeword space C of the ECC (e.g., D(•) may be the Hamming distance), and when τ may be defined as the error decoding threshold of the ECC, if D(ω, ω')<τ, then DECODE(δ⊕ω')=DECODE(δ⊕ω), and, therefore, c'=c. Therefore, when user device 60a may run an instance of the OPRF protocol with a server $S_i$ to learn APSR key $k_i'$=OPRFs$_i$(c') (e.g., at operation 525), if c'=c, then $k_i'$=$k_i$ (i.e., user device 60a may have correctly reconstructed high-entropy cryptographic APS key $k_i$ using an authentication codeword c' computed from ABS ω' and from trusted user device secret δ). Therefore, reconstruction of high-entropy cryptographic APS key $k_i$ as high-entropy cryptographic APSR key $k_i'$ may be successful (and, thus authentication eventually be successful) if the distance between EBT ω and ABS ω' is lower than the error decoding threshold τ of the ECC.

Once a high-entropy cryptographic APSR key $k_i'$ has been generated by user device 60a with its authentication codeword c' through use of an OPRF and a server secret $s_i$ of a server $S_i$, that APSR key $k_i'$ may be used in any suitable manner for authenticating the user/user device with the APSP (e.g., with TP subsystem 90). Process 500 may include one iteration of operation 525 with a single server $S_i$ for generating a single server APSR key $k_i'$, in which case that single server APSR key $k_i'$ may be used as APSR key k' for the remainder of process 500. Alternatively, process 500 may include m iterations of operation 525 with m server $S_1$-$S_m$ for generating m-server APSR keys $k_1'$-$k_m'$, in which case those m-server APSR keys $k_1'$-$k_m'$ may be used by APS device 60a to generate a singular APSR key k' for the remainder of process 500. For example, at operation 530 of process 500, the APS may be configured to generate singular APSR key k' from one or multiple server APSR keys $k_1'$-$k_m'$ using any suitable technique (e.g., any suitable multi-key polynomial interpolation algorithm(s)). The APS protocol may be configured to use a threshold secret sharing scheme to mitigate attacks that involve compromising a (possibly large) subset of the network nodes. APS application 69 may be configured to select the set of nodes m from network 40 randomly or based on any suitable enterprise policies. For example, certain policies can be pre-defined before the instantiation of the protocol. If needed, the policies can also be updated and correspondingly the user can interact with a new set of nodes in the network after the policy update. A node may be chosen based on its response time, but other selection policies are also appropriate. While the minimum number of nodes n may be 1, this number provides no redundancy and no ability to use secret sharing or distributing shares of a secret. A more typical minimum number of nodes n may be 3, where the number of nodes m to be n or n−1 or the like, or any other suitable number.

Then, once APSR key k' has been defined (e.g., as the sole server APSR key $k_i'$, or some suitable combination of multiple server APSR keys $k_1'$-$k_m'$), that APSR key k' may be used to generate any suitable authentication payload data (e.g., an APSR user keypair, a key hash, etc.), at least part of which (e.g., a private key of a key pair, the key hash, etc.) may be used to authenticate the user/device with the APSP. For example, at operation 530 of process 500, user device 60a may reconstruct any suitable APS user keypair (pk, sk) as APSR user keypair (pk', sk') using APSR key k'. Also, at operation 530 (e.g., before or after generation of APSR key k' and/or before or after generation of the APSR user keypair), user device 60a may generate and send any suitable TP authentication challenge request r (e.g., as data 530d) to an appropriate TP subsystem 90 (e.g., for authenticating with that TP subsystem). Then, in response to receiving challenge request r from user device 60a, TP subsystem 90 may access public key pk associated with that user device (e.g., as associated and stored at operation 432) and generate any suitable TP challenge R (e.g., as data 532d) that may be sent from TP subsystem 90 to user device 60a at operation 532. In response to receiving TP challenge R, user device 60a may be configured to generate (e.g., at operation 534) a challenge response and send that response to TP subsystem 90 (e.g., as data 534d), where the challenge response may be generated by signing the challenge R received from TP subsystem 90 with the private APSR user key sk' as challenge response sk'(R). Then, in response to receiving challenge response sk'(R), TP subsystem 90 may be configured to attempt to recover (e.g., at operation 536) challenge R from received challenge response sk'(R) using public APS user key pk (e.g., as may have been stored on TP subsystem 90 during enrollment of user device 60a (e.g., at operation 432 of process 400) and accessed by TP subsystem 90 (e.g., at operation 532 or otherwise of process 500 (e.g., at operation 536 prior to the recovery attempt))). If TP subsystem 90 is successfully able to recover challenge R from received challenge response sk'(R) using public APS user key pk, then TP subsystem 90 may verify that user device 60a has successfully reconstructed APS key k (e.g., as APSR key k' and ought to be authenticated, such that TP subsystem 90 may return any suitable successful Ack as authentication acknowledgement 536d at operation 536 for receipt by user device 60a. Once successful authentication of user device 60a may be confirmed by TP subsystem 90 to user device 60a with a confirmed successful acknowledgement (e.g., with data 536d), user device 60a may confirm authentication and delete any sensitive authentication information ("SAI") from user device 60a (e.g., at operation 538 (e.g., any suitable authentication acknowledgment data 536d may be used by user device 60a for any suitable secure operation SO)) and end process 500. Such SAI may include any suitable data, including, but not limited to, user authentication biometrics uab (e.g., as captured at operation 522), ABS ω' (e.g., as generated at operation 522), authentication codeword c' (e.g., as obtained at operation 524), each server APSR key $k_i'$ (e.g., as generated at operation 525), APSR key k', private key sk' of an APSR user keypair (e.g., as generated at operation 530) if not also public key pk' of the APSR user keypair (e.g., as may be generated at operation 530), and/or the like, while retaining trusted user device secret δ (e.g., as accessed at operation 504). Therefore, at the end of process 500, user device 60a may have gained knowledge of authentication acknowledgment data 536d that may be used by user device 60a for any suitable secure operation SO, and TP subsystem 90 may have at least temporarily authenticated user device 60a without gaining any knowledge of user authentication biometrics uab, ABS ω', authentication codeword c', any server APSR key $k_i'$, APSR key k', private key sk', trusted user device secret δ, and/or the like. In some embodiments, a successful Ack as authentication acknowledgement 536d may include secure operation data (e.g., private e-mail information (e.g., if TP subsystem 90 provides secure e-mail service), etc.). If Ack as authentication acknowledgement 536d is indicative of a negative authentication (e.g., when TP subsystem 90 is unable to recover challenge R at operation 536), the negative Ack may be processed by device 60a at operation 538 to deny authentication and delete the SAI.

For example, at operation 532, TP subsystem 90 may generate a challenge R (e.g., a partially random data structure), and then TP subsystem 90 may send that challenge R as at least a portion of data 532d back to user device 60a (e.g., according to application 99 of that particular TP subsystem 90). At operation 534, user device 60a may receive challenge R of data 532d from TP subsystem 90, generate a challenge response sk'(R) for received challenge R by signing that challenge R with the device's private user APSR key sk' (e.g., challenge response $Sign_{sk'}(R)$), and then send that challenge response back to the appropriate TP subsystem 90 as at least a portion of data 534d (e.g., according to application 69 of user device 60a). At operation 536, TP subsystem 90 may receive data 534d from user device 60a, attempt to authenticate the public user key pk of earlier received data 430d using the challenge response sk'(R) of recently received data 534d, generate an authentication acknowledgment Ack that may be indicative of whether or not TP subsystem 90 was able to authenticate the public user key (e.g., confirm or deny authentication), and then TP subsystem 90 may send that verification acknowledgment Ack as at least a portion of data 536d back to user device 60a (e.g., according to application 99 of that TP subsystem 90). This may enable TP subsystem 90 to authenticate whether or not public user key pk is indeed the public user key of user device 60a. If TP subsystem 90 is unable to authenticate, then TP subsystem 90 may delete the key (e.g., as stored at operation 432) in certain embodiments and require the user device to re-enroll before attempting to re-authenticate. However, if TP subsystem 90 is able to authenticate, then TP subsystem 90 may communicate any suitable authenticated acknowledgement data that may enable APS user device 60a to carry out any suitable secure operation. At operation 538, user device 60a may receive and register successful authentication acknowledgment Ack of data 536d from TP subsystem 90 (e.g., according to application 69 of user device 60a). If the received Ack is indicative of a positive authentication by TP subsystem 90, then user device 60a may determine that it has been authenticated by TP subsystem 90 and may carry out any suitable secure operation based on that authentication acknowledgment $Ack_i$ of data 536d. Therefore, in some embodiments, while high-entropy cryptographic APS key k reconstructed as high-entropy cryptographic APSR key k' may not be used on its own by user device 60a to carry out a secure operation SO, proof of such reconstruction (e.g., through challenge response sk'(R)) may be used by the APSP to enable user device 60a to carry out a secure operation SO in response to receiving any suitable successful authentication acknowledgment Ack of data 536d or such data may be at least a portion of the secure operation. However, if the received Ack is indicative of a negative or unsuccessful authentication by TP subsystem 90, then user device 60a may determine that it has not successfully reconstructed high-entropy cryptographic APS key k as high-entropy cryptographic APSR key k' and may attempt to repeat one or more of operations 504-532 (e.g., after deletion of some or all of the SAI).

For example, in response to a successful authentication of user device 60a, TP subsystem 90 may generate any suitable successful authentication acknowledgment Ack of data 536d for receipt and use by user device 60a, including, but not limited to, TP subsystem 90 enabling any suitable functionality(ies) (e.g., it can release an authentication token, provide access to the user's emails, etc.)). A successful authentication by TP subsystem 90 may enable the user device to be trusted by that TP subsystem 90 and TP subsystem 90 may therefore be configured to authorize the user device to perform various suitable actions or secure operations. For example, in some embodiments, the response to the challenge may be sent to TP subsystem 90 via an authenticated connection (e.g., transport layer security ("TLS")) and any operation performed within the same connection after TP subsystem 90 receives the response to the challenge can be attributed to the user who just authenticated, or, after receiving the response to the challenge, TP subsystem 90 may be configured to issue an authentication token that may be used by the client to perform secure operations.

The operations shown in process 500 of FIG. 5 are only illustrative and it is understood that existing operations may be modified or omitted, additional operations may be added, and the order of certain operations may be altered. Much of authentication process 500 may be carried out transparently to user U for providing a more seamless and efficient user experience. For example, operation 504 may be transparent to user U. As another example, operations 522-538, including the entirety of two or more iterations of operation 525 for two or more server nodes, may be transparent to user U (e.g., between being presented with a request to provide user authentication biometrics (if necessary) and being presented with a confirmation of authentication (if necessary)).

FIG. 6

FIG. 6 illustrates a flowchart of another exemplary process 600 for enrolling an APS user device and a user thereof with the APSP. Process 600 is shown being implemented by APS user device 60b, its user U, a TPS device 60c and a selection of servers or nodes 70 (e.g., a number n of selected nodes 70 (e.g., nodes 70a, 70b, 70c, . . . , 70n)). However, process 600 may be implemented using any other suitable components or subsystems or entities of system 1 of FIG. 1 or otherwise. For example, as shown by the particular example of FIG. 6, process 600 may be implemented by a system similar to system 301 of FIG. 3, where sensor(s) (e.g., sensor 65) incorporated into TPS device 60c may be used for capturing user enrollment biometrics ueb, although any other configuration may be possible for carrying out the concepts of process 600. Process 600 may provide a seamless user experience for securely and efficiently enrolling user U and its user device 60b with the APSP. To facilitate the following discussion regarding the operation of system 1 for enrolling user U and its user device 60b with the APSP according to process 600 of FIG. 6, reference is made to various components of system 1 of the schematic diagrams of FIGS. 1-1D.

Each one of operations 602 and 620 carried out by source R of process 600 may be the same as or similar to respective operations 402 and 420 carried out by source R of process 400, data 602d and data 620d and data $TPP_i$, 627d may be the same as or similar to data 402d and data 420d and data $TPP_i$, 427d of process 400, and each one of operations 604, 622, 624, 625, and 626 carried out by TPS device 60c of process 600 may be the same as or similar to respective operations 404, 422, 424, 425, and 426 carried out by APS device 60a of process 400, and will not be redescribed in detail herein. However, once a high-entropy cryptographic APS key $k_i$ has been generated at operation 625 by TPS device 60c with its enrollment codeword c through use of an OPRF and a server secret $s_i$ of a server $S_i$, that APS key $k_i$ may be used in any suitable manner for enrolling the user/user device 60b with the APSP (e.g., with TPS device 60c). Moreover, the generation of a singular APS key k from one or more server APS keys at operation 630 may be similar to that of operation 430.

However, unlike in process 400, once APS key k has been determined, TPS device 60c may generate any suitable hashed value h using any suitable secure collision-resistant cryptographic hash function H(•) on APS key k at operation 630. In some embodiments, TPS device 60c may obtain APS key $k_i$ using enrollment codeword c and then use that APS key $k_i$ or distinct ones thereof as APS key k with codeword c to generate a hashed value $h_i$, such as by value $h=HMAC_c$(k). For such a hash-based message authentication code ("HMAC"), the APSP may use HMAC-SHA256, but, in other embodiments, HMAC could be instantiated with other collision-resistant hash functions without impacting the security of the protocol. Further, HMAC can be replaced by any suitable pseudorandom function family ("PRF") (e.g., any suitable efficiently-computable function of the PRF), where value h may be generated using any PRF computed over APS key k and enrollment codeword c. Alternatively, the APSP may use $HMAC_c$(k) as a source of randomness for any suitable key generation algorithm (e.g., an elliptic curve digital signature algorithm ("ECDSA")) that may be used to generate value h. Therefore, value h may be deterministically generated from APS key k. In some embodiments, enrollment codeword c may not be utilized at operation 630 and value h may be defined using APS key k but not also codeword c. This hash function of process 600, like any suitable function for generating a user APS key pair of process 500, may be any suitable function made available to device 60c by the APSP.

Moreover, at operation 630, after generating value h using APS key k, TPS device 60c may share any suitable access card data ("ACD") 430d with an APS user device 60b that may be used by the user (e.g., user U of source R), where ACD 430d may include value h (e.g., as generated at operation 630) and trusted user device secret δ (e.g., as generated at operation 624), such that APS user device 60b may store (e.g., at operation 632) that value h and trusted user device secret δ (e.g., as data 69d on memory 63 of device 60b) and later use that data for any suitable future authentication process associated with user U and/or user device 60b (e.g., at operation 706 of process 700 of FIG. 7). In some embodiments, secret δ and value h (e.g., H(k)) can be optionally signed using a trusted signing key prior to sharing (e.g., at operation 632) or later accessing (e.g., at operation 704) (e.g., the user or otherwise may optionally submit δ and H(k) to a signing authority (e.g., the IT department of the company that deployed the physical barrier 66ca), and may store the resulting signature on the trusted device). In some particular embodiments, a public counterpart of such a signing key may be disclosed to a turnstile (e.g., TPS device 60c), which may use it to verify that the signature on secret δ and value h as accessed (e.g., at operation 704) is valid before authenticating the user (e.g., at operation 730) (e.g., if δ and H(k) are signed, the physical barrier may verify the signature before running the protocol).

Once receipt and storage of such a value h based on APS key k and trusted user device secret δ may be confirmed by APS user device 60b to TPS device 60c with a confirmed acknowledgement (e.g., with data 632d), TPS device 60c may confirm or deny the enrollment and delete any sensitive enrollment information ("SET") from TPS device 60c (e.g., at operation 634) and end process 600. Such SEI may include any suitable data, including, but not limited to, user enrollment biometrics ueb (e.g., as captured at operation 622), EBT w (e.g., as generated at operation 622), enrollment codeword c (e.g., as obtained at operation 604), trusted user device secret δ (e.g., as generated at operation 624), server APS key(s) (e.g., as generated at operation 625), APS key k (e.g., as may be generated at operation 630), value h (e.g., as generated at operation 630), and/or the like. Therefore, at the end of process 600, user device 60b may have gained knowledge of trusted user device secret δ and value h, but not of APS key k or ueb or EBT, while TPS device 60c and server $S_i$ may have gained no knowledge. The APS user device 60b may generate an enrollment verification acknowledgment Ack that may be indicative of that device fully enrolling user device 60b with the value h based on APS key k and trusted user device secret δ, and then the user device may send that verification acknowledgment Ack as at least a portion of data 632d back to TPS device 60c (e.g., according to application 69 of that particular user device 60b). Alternatively, user device 60b may be passive and may not be running any application 69 but may be operative to store the value h and trusted user device secret δ in such a manner that TPS device 60c may be confident in the storage to proceed as such at operation 634, whereby TPS device 60c may be enabled to end the enrollment process 600. Ending enrollment process 600 may include confirming that no sensitive enrollment information SEI remains on device 60c. This may include deleting any or each of the following items of information SEI of each applicable node i and/or for the entire enrollment process: user enrollment biometrics ueb of the enrollment process, enrollment codeword c of the enrollment process, EBT ω of the enrollment process, trusted user device secret δ, server APS key(s) $k_i$ and APS key k of the enrollment process, and value h of the enrollment process. This deletion of sensitive enrollment information SEI (e.g., at operation 634) from TPS device 60c during this enrollment process may prevent such information from being accessed by TPS device 60c if TPS device 60c were somehow compromised after enrollment of user device 60b. Moreover, certain information, even before deletion, may never be provided to certain portions of memory 63 of TPS device 60c. For example, an APSP SDK of the client TPS application 69 of TPS device 60c may retain at least codeword c and EBT ω and user device secret δ and/or APS key k and/or any other suitable data of the SEI inside the APSP SDK and not allow such data to be provided to other portions of the APS application 69 and/or to other applications of TPS device 60c. The APSP SDK may be configured never to save such data to a permanent storage of device memory 63 (e.g., a flash memory portion of memory 63) of TPS device 60c, but only in device volatile memory or otherwise of device memory 63 (e.g., a RAM portion of memory 63) of TPS device 60c, and may be configured to overwrite such data with zeroes or otherwise delete such data (e.g., overwrite with 0's then overwrite with 1's then overwrite with random data) once the values are no longer necessary for the enrollment process (e.g., at operation 634). However, if the received Ack is indicative of a negative verification by user device 60b for particular ACD 430d, then TPS device 60c may be configured to repeat one or more of operations 604-630 (e.g., after deletion of some or all of the SEI).

The operations shown in process 600 of FIG. 6 are only illustrative and it is understood that existing operations may be modified or omitted, additional operations may be added, and the order of certain operations may be altered. Much of enrollment process 600 may be carried out transparently to user U for providing a more seamless and efficient user experience. For example, operation 404 may be transparent to user U (e.g., between being presented with screen 800a of FIG. 8A and being presented with screen 800b of FIG. 8B (e.g., on TPS device 60c rather than on a user device 60a)). As another example, operations 622-634, including the entirety of two or more iterations of operation 425 for two or more server nodes, may be transparent to user U (e.g., between being presented with screen 800f of FIG. 8F and being presented with screen 800i of FIG. 8I (e.g., on TPS device 60c rather than on a user device 60a, and without any notification request(s) as in screen 800i)).

FIG. 7

Various processes may be carried out in order for a user of a user device to be authenticated by the APSP for executing any suitable secure operation (e.g., for securely being granted access (e.g., physical access by a TPS device)), including, but not limited to, processes 700 of FIG. 7. For example, FIG. 7 illustrates a flowchart of exemplary process 700 for authenticating an enrolled APS user of an enrolled APS user device with the APSP. Process 700 is shown being implemented by APS user device 60b, its user U, TPS device 60c, and a selection of servers or nodes 70 (e.g., a number n of selected nodes 70 (e.g., nodes 70a, 70b, 70c, . . . , 70n)). However, process 700 may be implemented using any other suitable components or subsystems or entities of system 1 of FIG. 1 or otherwise. For example, as shown by the particular example of FIG. 7, process 700 may be implemented by a system similar to system 301 of FIG. 3, where sensor(s) (e.g., sensor 65) incorporated into device 60c may be used for capturing user authentication biometrics uab, although any other configuration may be possible for carrying out the concepts of process 700. Process 700 may provide a seamless user experience for securely and efficiently authenticating with the APSP an enrolled APS user U and its enrolled APS user device 60b (e.g., as enrolled by process 500). To facilitate the following discussion regarding the operation of system 1 for authenticating user U and its user device 60b with the APSP according to process 700 of FIG. 7, reference is made to various components of system 1 of the schematic diagrams of FIGS. 1-1D.

Each one of operations 702 and 720 carried out by source R of process 700 may be the same as or similar to respective operations 502 and 520 carried out by source R of process 500, data 702d and data 720d and data $TPP_i$, 727d may be the same as or similar to data 502d and data 520d and data $TPP_i$, 527d of process 500, and each one of operations 704, 722, 724, 725, and 726 carried out by TPS device 60c of process 700 may be the same as or similar to respective operations 504, 522, 524, 525, and 526 carried out by APS device 60a of process 500, and will not be redescribed in detail herein. One exception being that, at operation 704, rather than accessing user device secret δ, from memory of TPS device 60c (e.g., as user device 60a may do from its memory at operation 504 of process 500), TPS device 60c may access user device secret δ and value h from enrolled user device 60b as at least a portion of shared access card data 707d (e.g., as may be shared by user device 60b at an operation 706 (e.g., when user U may swipe or closely position device 60b with respect to TPS device 60c). Then, while authentication codeword c' from operation 724 is still available to TPS device 60c, TPS device 60c and each of one or more servers S may work together using any suitable secure multi-party computation (e.g., using OPRF (e.g., according to application 69)) to generate a respective APSR key k' (e.g., a reconstruction of APS key k) using authentication codeword c' of TPS device 60c (e.g., a reconstruction of codeword c) and server secrets of the respective server S. Then, once a high-entropy cryptographic APSR key $k_i'$ has been generated at operation 725 by TPS device 60c with its enrollment codeword c' through use of an OPRF and a server secret $s_1$ of a server $S_i$, that APSR key $k_i'$ may be used in any suitable manner for authenticating the user/user device 60b with the APSP (e.g., with TPS device 60c).

For example, at operation 730 of process 700, after generating any singular APSR key k' from one or any other suitable number of server APSR keys $k_1'$-$k_m'$, TPS device 60c may generate any suitable hashed value h' using any suitable secure collision-resistant cryptographic hash function H(•) on APSR key k'. (e.g., the same function H(•) used by TPS device 60c at operation 630 (e.g., as may be defined by the APSP (e.g., by application 69 of TPS device 60c))). Then, once TPS device 60c has determined value h' on reconstructed APSR key k', TPS device 60c may compare determined value h' (e.g., H(k) of operation 730) with accessed value h (e.g., H(k) of operation 704) at operation 730 and, if the comparison is successful (e.g., if they are equal), then TPS device 60c may authenticate user device 60b, delete any sensitive authentication information ("SAI") and confirm authentication by carrying out any suitable secure operation(s) SO. For example, once successful authentication of user device 60b may be confirmed by TPS device 60c (e.g., by a successful comparison of generated value h' with accessed value h), TPS device 60c may delete any sensitive authentication information ("SAI") from TPS device 60c and confirm authentication (e.g., at operation 730 (e.g., any suitable authentication secure operation SO may be enabled by TPS device 60c for authenticated user U/user device 60b)) and end process 700. Such SAI may include any suitable data, including, but not limited to, user authentication biometrics uab (e.g., as captured at operation 722), ABS ω' (e.g., as generated at operation 722), authentication codeword c' (e.g., as obtained at operation 724), any server APSR key(s) $k_i'$ (e.g., as generated at operation 725), APSR key k' (e.g., as may be generated at operation 730), value h'

(e.g., as generated at operation 730), value h (e.g., as accessed at operation 704), and user device secret δ (e.g., as accessed at operation 704). Therefore, at the end of process 700, user device 60b may retain value h and user device secret δ, while server Si may not have stored any new secure authentication data, and while TPS device 60c may not have stored any new secure authentication data but may be used by the APSP for any suitable secure operation SO. For example, TPS device 60c may be operative to carry out any suitable secure operation in response to such a successful authentication acknowledgment, where the secure operation may include TPS device 60c enabling the user to turn through a turnstile or unlock a personal access gate 66ca or a smart doorknob (e.g., of a hotel room) or otherwise that may be communicatively coupled to or a part of device 60c or otherwise (see, e.g., FIG. 3). However, if the comparison of operation 730 is unsuccessful (e.g., h' is determined not to compare favorably with h), then authentication may be denied, no secure operation may be enabled, and yet the SAI may still be deleted.

Therefore, in some embodiments of the APSP that may utilize an enrollment process similar to process 600 and an authentication process similar to process 700, a user or TPS device 60c may not prove to a remote TP subsystem 90 that it authenticated correctly. Instead, the user authenticates to TPS device 60c itself (e.g., a turnstile controlling device) by revealing ABS ω' such that H(OPRFs$_i$(DECODE (δ⊕ω')))=H(k), where H(k) and δ may be stored on and retrieved from user device 60b (e.g., access card (e.g., a magnetic card or smart card)) by TPS device 60c. A server S$_i$ may only store its own server secret which may not be user-specific.

The operations shown in process 700 of FIG. 7 are only illustrative and it is understood that existing operations may be modified or omitted, additional operations may be added, and the order of certain operations may be altered. Much of authentication process 700 may be carried out transparently to user U for providing a more seamless and efficient user experience. For example, operation 704 may be transparent to user U. As another example, operations 722-730, including the entirety of two or more iterations of operation 725 for two or more server nodes, may be transparent to user U (e.g., between being presented with a request to provide user authentication biometrics (if necessary) and being presented with a confirmation of authentication (if necessary)).

While processes 400-700 may be carried out by a single server (e.g., a single server S$_i$ with a secret s$_i$), it is to be understood that two or more servers may each be used in a similar fashion with user device 60a (e.g., at operation 425 of process 400 and/or at operation 525 of process 500) and/or with TPS device 60c (e.g., at operation 625 of process 600 and/or at operation 725 of process 700) or in any different manner. For example, a multi-server variant may be employed to increase security against compromise of a single server, such that any suitable features or processes of the APSP may be instantiated to use multiple servers. For example, in such embodiments, to generate key k, an at least semi-trusted device may run one instance of a TP (e.g., OPRF) protocol with each of the multiple servers, were each of the n servers may contribute its own respective (e.g., distinct and/or unrelated) server secret s$_i$ (1≤i≤n). As a result the at least semi-trusted device may obtain keys k$_1$, . . . , k$_n$. The at least semi-trusted device may apply any suitable polynomial interpolation algorithm to construct a key k from keys k$_1$, . . . , k$_n$. The at least semi-trusted device or any other suitable entity of the APSP may be enabled to tune any suitable parameter(s) of such a polynomial interpolation algorithm to achieve reconstruction of key k using any server subset of size t≤n of {k$_1$, . . . , k$_n$}. Such a variant may be configured to guarantee that, if an adversary corrupts less than t servers, then the adversary may not be enabled to reconstruct key k. Further, it may guarantee that if (at least) t servers are available, then the at least semi-trusted device can reconstruct key k. When t=n, this variant can be further simplified by computing key k=PRF(k$_1$∥ . . . ∥k$_n$)(c) instead of using polynomial interpolation.

Although some examples of how one or more servers or a TPS device may be used to enable a secure operation SO through authentication, there are countless others. For example, TPS device 60c may be operative to manage a user's booking of a hotel room and enabling secure entry into that hotel room using the APSP. For example, during process 600, TPS user device 60c may be any suitable device that user U may interface with for booking a hotel room for a particular date (e.g., any device operative to run an app or website of a travel agency or hotel management entity, which may be APS user device 60a or a distinct different device) and/or registering that user's hotel booking or that user's hotel booking service account with that user's enrollment with the APSP. Then, during process 700, TPS user device 60c may be any suitable device that user U may interface with for gaining access to the booked hotel room on the particular date (e.g., a smart doorknob or lock that may be operative to automatically unlock and grant access to a hotel room if the user may be authenticated by the APSP). For example, at operations 702 and/or 704 and/or 706 and 720, user U may utilize APS user device 60b to communicate with such a TPS user device 60c (e.g., using NFC or Bluetooth or RFID or swiping a magnetic strip or any other suitable communication path), which may indicate that the user is present outside the hotel room and would like to authenticate with the hotel booking service, and then APS user device 60b may provide shared access card data 707d and user may provide user authentication biometrics uab to TPS device 60c for enabling the authentication process of process 700 to carry out any suitable authenticated secure operation, where the secure operation may include unlocking the door to the hotel room using TPS user device 60c (e.g., the smart doorknob (e.g., device component 66ca or otherwise)).

As another particular example, a system may be operative to track a user's location (e.g., for confirming that a user is doing its designated tasks (e.g., that a security guard is checking various locations throughout a shift)) using the APSP. For example, during process 600, TPS user device 60c may be any suitable device that user U may interface with for registering with a tracking service and/or registering that tracking service with that user's enrollment with the APSP (e.g., using a user device 60b). Then, during process 700, TPS user device 60c may be any suitable device that user U may interface with (e.g., using a user device 60b) for proving that the user U was located near that TPS user device 60c (e.g., a beacon (e.g., a Bluetooth low energy beacon transmitter device) that may be operative to communicate data indicative of the beacon and/or its location as well a time at which that data was communicated)). For example, at operations 702 and/or 704 and/or 706 and 720, user U may utilize APS user device 60b to communicate with such a TPS user device 60c (e.g., using NFC or Bluetooth or any other suitable communication path), which may request beacon data and/or beacon data may be automatically (e.g., periodically) communicated between the devices. This may be used for facilitating a secure operation, such as for securely determining that the user authenticated with the APSP to prove that APS user device 60b and user U was proximate beacon TPS user device 60c at the time of a timestamp.

In some embodiments, rather than generating an EBT ω based on captured user enrollment biometrics ueb (e.g., as user enrollment biometric identifier information or user enrollment biometric information, which may be indicative of a user's physiological and/or behavioral characteristics, as captured by one or more suitable sensors of the APS user device (e.g., at operation 422 and/or operation 622), the EBT ω may additionally or alternatively be generated during an APS enrollment process based on any suitable enrollment device environmental data that may be captured by any suitable sensors of the APS user device as indicative of any suitable characteristic(s) of the device environment and/or that may be provided to the APS user device from any suitable third party source. Moreover, rather than generating an ABS ω' based on captured user authentication biometrics uab (e.g., as user authentication biometric identifier information or user authentication biometric information, which may be indicative of a user's physiological and/or behavioral characteristics, as captured by one or more suitable sensors of the APS user device (e.g., at operation 522 and/or operation 722), the ABS ω' may additionally or alternatively be generated during an APS authentication process based on any suitable authentication device environmental data that may be captured by any suitable sensors of the APS user device (e.g., concurrently with any captured user authentication biometrics uab) as indicative of any suitable characteristic(s) of the device environment. Therefore, the success or failure of any evaluation of EBT ω and ABS ω' (e.g., of process 500 and/or process 700 via reconstruction) may be based on a determined closeness between the enrollment device environmental data of the EBT ω and the authentication device environmental data of the ABS ω' (if not also on a determined closeness between the user enrollment biometrics ueb of the EBT ω and the user authentication biometrics uab of the ABS ω'). Such environmental data may be any suitable data indicative of any suitable characteristic(s) of the environment of the APS user device, including, but not limited to, location, temperature, air quality, light quality, sound quality, altitude, data captured by wireless sensor(s), and/or the like.

Therefore, an at least semi-trusted device may be configured to use an ECC to select a random codeword c from a codeword space C where |c|=|ω|, and the device may sample or otherwise obtain a low min-entropy signal/enrollment template a), and the device may computes and store a device secret δ on a trusted user device controlled by user, where δ=c⊕ω or the like of the ECC. The at least semi-trusted device may generate/compute a high-entropy cryptographic key k from ω, δ, and server secret(s) $s_1, \ldots, s_n$ for some n>0 servers, where, to generate k, the at least semi-trusted device may runs an instance of a TP protocol (e.g., OPRF protocol (e.g., as may be described by "Keyword search and oblivious pseudorandom functions, In Theory of Cryptography Conference," pages 303-324, Springer, 2005, Michael J Freedman, Yuval Ishai, Benny Pinkas, and Omer Reingold, and/or by "Efficient oblivious pseudorandom function with applications to adaptive of and secure computation of set intersection, In Theory of Cryptography Conference," pages 577-594, Springer, 2009, Stanislaw Jarecki and Xiaomin Liu, each of which is hereby incorporated by reference herein in its entirety), with the at least semi-trusted device to learn k=$OPRFs_i(c)$. Therefore, a result of this process may be using one of more servers, which may independently transform a codeword c using their secret(s) $s_i$. Later, similar process(es) may enable at least semi-trusted device to reconstruct k. When the system is deployed using more than one server, it may be possible to reconstruct k when a predetermined number t of servers return their transformed value (e.g., 3 out of 5). However, in some embodiments, the APSP may be configured such that no key k can be reconstructed if less than t servers join the process.

In some embodiments, a key k can be used to authenticate a user/trusted user device (or any other source of reproducible noise), where a user may enroll by generating k and using it to deterministically derive a user keypair (pk, sk), where the user may send pk to the server, or to any other relying party against which it may want to authenticate in the future. In such embodiments (e.g., of FIGS. 2,4, and 5), the APSP may have the following security properties: (1) the key reconstruction process may not disclose trusted device secret δ to the server(s) or to the sensor (e.g., when the sensor is distinct from the trusted user device; (2) the key reconstruction process may not disclose the secret(s) s of the server(s) to the user's device or the sensor; (3) the key reconstruction process may not disclose low min-entropy signal/enrollment sample ω to the server(s); (4) the key reconstruction process may not disclose key k to the server(s); (5) letting n be the number of servers, at least t out of n servers (t≤n) may be used in the key reconstruction process to reconstruct k, for some t (e.g., as may be selected a priori by the user or APSP); (6) any adversary with no access to trusted device secret δ may not reconstruct key k except with negligible probability (e.g., as a result, the trusted user device ought participate in the key reconstruction process in order to allow any of the servers to determine whether a particular key matches a user); and/or (7) any adversary with access to trusted device secret δ cannot reconstruct key k without interacting with at least t servers, except with negligible probability. In such embodiments, to authenticate, the user may recover key k, derive the same user keypair (pk, sk), and use the secret key sk to sign a random challenge generated by the server or by a relying party, thus proving knowledge of the secret key sk and thus key k.

In some other embodiments, a hash of key k may be stored with trusted device secret δ on a trusted user device (e.g., access card) and later recovered therefrom by a semi-trusted device to compare the hash of key k with the hash of a reconstructed key k'. In such embodiments (e.g., of FIGS. 3, 6, and 7), the APSP may have the following security properties: (1) the key reconstruction process may not disclose trusted device secret δ to the server(s); (2) the key reconstruction process may not disclose the secret(s) s of the server(s) to the user's device or the sensor; (3) the key reconstruction process may not disclose low min-entropy signal/enrollment sample ω to the server(s); (4) the key reconstruction process may not disclose key k to the server(s); (5) letting n be the number of servers, at least t out of n servers (t≤n) may participate in the key reconstruction process to reconstruct key k for some t (e.g., as may be selected (e.g., a priori by the user or by the APSP)); (6) any adversary with no access to trusted device secret δ cannot reconstruct key k except with negligible probability (e.g., as a result, a user device may participate in the key reconstruction process to allow any of the servers to determine whether a particular key matches a user); and/or (7) any adversary with access to trusted device secret δ may not reconstruct key k without interacting with at least t servers, except with negligible probability. In such embodiments, to authenticate, the user (e.g., trusted/passive user device) may approach a security barrier (e.g., a relying party), which may acquire ABS ω' using the capture device, the user may provide trusted device secret δ and H(k) to the security barrier using a trusted device (e.g., access card), the security barrier may interacts with the server(s) to reconstruct key k as key k', and then the security barrier may compute H(k') with the reconstructed key and allow an authenticated security operation (e.g., security access past the security barrier (e.g., physical access control)) only if H(k')=H(k).

FIG. 9

FIG. 9 is a flowchart of an illustrative process 900 for enrolling a user in a system that includes a first subsystem and a second subsystem storing a server secret. At operation 902 of process 900, the first subsystem may select an enrollment codeword from a codeword space (e.g., device 60a may select an enrollment codeword c at operation 404 of process 400, device 60c may select an enrollment codeword c at operation 604 of process 600, etc.). At operation 904 of process 900, the first subsystem may obtain an enrollment template indicative of enrollment information provided by the user (e.g., device 60a may obtain an enrollment template ω at operation 422 of process 400, device 60c may obtain an enrollment template ω at operation 622 of process 600, etc.). At operation 906 of process 900, the first subsystem may compute a trusted user secret based on the enrollment codeword and the enrollment template (e.g., device 60a may compute a trusted user secret δ at operation 424 of process 400, device 60c may compute a trusted user secret δ at operation 624 of process 600, etc.). At operation 908 of process 900, the first subsystem may run an instance of a two-party protocol with the second subsystem using the enrollment codeword and the server secret to generate an enrollment key (e.g., device 60a may run an instance of a two-party protocol with a server $S_i$ using the enrollment codeword c and the server secret $s_i$ to generate an enrollment key $k_i$ at operation 425 of process 400, device 60c may run an instance of a two-party protocol with a server $S_i$ using the enrollment codeword c and the server secret $s_i$ to generate an enrollment key at operation 625 of process 600, etc.). The enrollment key may then be used by the first subsystem to enable a secure operation (e.g., for encrypting or otherwise protecting data to be stored on the first subsystem or otherwise, for generating an enrollment keypair of which a public key may be shared with a third party subsystem for future authentication, for generating a hash value that may be stored on a remote third subsystem (e.g., an access card) along with the trusted user secret for future authentication).

The operations shown in process 900 of FIG. 9 are only illustrative and it is understood that existing operations may be modified or omitted, additional operations may be added, and the order of certain operations may be altered.

In some embodiments, a method (e.g., a method similar to process 900) may further include protecting, at the first subsystem, sensitive data using the enrollment key (e.g., user device 60a may protect (e.g., encode or otherwise) any suitable sensitive data using the enrollment key k (e.g., using key k itself or using any suitable enrollment user key of an enrollment user key pair that may be derived from key k)). In some embodiments, such protected data may then be stored on the first subsystem and/or on a third subsystem remote from the first subsystem (e.g., user device 60a may store that protected data on device 60a (e.g., in memory 63) or on any suitable remote subsystem (e.g., TP subsystem 90 or server 70 or otherwise)). In some embodiments, after protecting the sensitive data, the method may include deleting sensitive enrollment information from the first subsystem, wherein the sensitive enrollment information may include the selected enrollment codeword, the obtained enrollment template, and the generated enrollment key (e.g., user device 60a may delete SEI at operation 434, user device 60c may delete SEI at operation 634, etc.). In some embodiments, after such deleting, the method may include obtaining, at the first subsystem, an authentication sample indicative of authentication information provided by an entity, computing, at the first subsystem, an authentication codeword by decoding a decombination of the trusted user secret and the authentication sample, and running, at the first subsystem, an instance of the two-party protocol with the second subsystem using the authentication codeword and the server secret to generate an authentication key (e.g., user device 60a may carry out operations 522, 524, 525, and optionally a portion of operation 530 to generate an authentication key k'). Then, in some embodiments, the method may include accessing, at the first subsystem, the protected sensitive data and unprotecting, at the first subsystem, the protected sensitive data using the authentication key (e.g., user device 60a may access the protected sensitive data (e.g., from memory 63 of the user device or from a remote subsystem) and then unprotect (e.g., decrypt) the protected sensitive data using key k' (e.g., using key k' itself or using any suitable authentication user key of an authentication user key pair that may be derived from key k')). Then, in some embodiments, the method may include deleting sensitive authentication information from the first subsystem, wherein the sensitive authentication information may include the obtained authentication sample, the computed authentication codeword, and the generated authentication key (e.g., user device 60a may delete SAI at operation 538, user device 60c may delete SAI at operation 730, etc.).

In some embodiments, a method (e.g., a method similar to process 900) may further include generating, at the first subsystem, an enrollment payload based on the enrollment key, sending, from the first subsystem to a third subsystem remote from the first subsystem, at least a first portion of the enrollment payload, and, after the sending, deleting sensitive enrollment information from the first subsystem, wherein the sensitive enrollment information may include the selected enrollment codeword, the obtained enrollment template, the generated enrollment key, and at least a second portion of the enrollment payload (e.g., user device 60a may at least partially carry out operations 430 and 434, user device 60c may at least partially carry out operations 630 and 634, etc.). In some embodiments, such an enrollment payload may include an enrollment user keypair including an enrollment user public key and an enrollment user private key (e.g., user device 60a may generate an enrollment payload including an enrollment user keypair (pk, sk) using enrollment key k at operation 430). In some embodiments, the sending of the method may include sending, from the first subsystem to the third subsystem, the enrollment user public key of the enrollment user key pair of the enrollment payload (e.g., user device 60a may send enrollment user public key pk to TP subsystem 90 at operation 430) and the at least a second portion of the enrollment payload may include the enrollment user private key of the enrollment user key pair (e.g., the SEI of operation 434 may include the enrollment user private key sk). In some embodiments, the method may also include, after the deleting the sensitive enrollment information, obtaining, at the first subsystem, an authentication sample indicative of authentication information provided by an entity, computing, at the first subsystem, an authentication codeword by decoding a decombination of the trusted user secret and the authentication sample, running, at the first subsystem, an instance of the two-party protocol with the second subsystem using the authentication codeword and the server secret to generate an authentication key, generating, at the first subsystem, an authentication payload based on the authentication key, wherein the authentication payload includes an authentication user keypair including an authentication user public key and an authentication user private key, sending, from the first subsystem to the third subsystem, a challenge response including a challenge signed by the authentication user private key of the authentication payload, and, after the sending the challenge response, deleting sensitive authentication information from the first subsystem, wherein the sensitive authentication information includes the obtained authentication sample, the computed authentication codeword, the generated authentication key, and at least the authentication user private key of the authentication payload (e.g., user device 60a may carry out operations 522, 524, 525, 530, 534, and 538). In some embodiments, the method may include, prior to the sending the challenge response, receiving, at the first subsystem from the third subsystem, the challenge (e.g., user device 60a may receive a challenge from TP subsystem 90 at operation 534).

In some embodiments, a method (e.g., a method similar to process 900) may further include generating, at the first subsystem, an enrollment payload based on the enrollment key, sending, from the first subsystem to a third subsystem remote from the first subsystem, at least a first portion of the enrollment payload, and, after the sending, deleting sensitive enrollment information from the first subsystem, wherein the sensitive enrollment information may include the selected enrollment codeword, the obtained enrollment template, the generated enrollment key, and at least a second portion of the enrollment payload, wherein the enrollment payload may include an enrollment hash value including the result of a hash function on the enrollment key (e.g., user device 60c may at least partially carry out operations 630 and 634, wherein user device 60c may generate an enrollment payload including an enrollment hash value h that may be the result of running a hash function H on enrollment key k at operation 630). In some embodiments, the sending of the method may include sending, from the first subsystem to the third subsystem, the enrollment hash value of the enrollment payload and the trusted user secret (e.g., user device 60c may send hash value h and trusted user secret δ to user device 60b), the at least a second portion of the enrollment payload may include the enrollment hash value of the enrollment payload (e.g., SEI of operation 634 may include hash value h), and the sensitive enrollment information may further include the trusted user secret (e.g., SEI of operation 634 may include trusted user secret δ). In some embodiments, the method may further include, after the deleting the sensitive enrollment information, obtaining, at the first subsystem, an authentication sample indicative of authentication information provided by an entity, accessing, at the first subsystem from the third subsystem, the trusted user secret and the enrollment hash value, computing, at the first subsystem, an authentication codeword by decoding a decombination of the trusted user secret and the authentication sample, running, at the first subsystem, an instance of the two-party protocol with the second subsystem using the authentication codeword and the server secret to generate an authentication key, generating, at the first subsystem, an authentication payload based on the authentication key, wherein the authentication payload may include an authentication hash value including the result of the hash function on the authentication key, and comparing, at the first subsystem, the authentication hash value with the enrollment hash value (e.g., user device 60c may carry out at least a portion of operations 704, 722, 724, 725, and 730). In some embodiments, the method may also include selectively providing, to the entity with the first subsystem, secure access based on the comparing (e.g., user device 60c may use component 66ca to carry out an authentication of operation 730). In some embodiments, the method may also include, after the comparing, deleting sensitive authentication information from the first subsystem, wherein the sensitive authentication information may include the obtained authentication sample, the computed authentication codeword, the generated authentication key, the trusted user secret, the enrollment hash value, and the authentication hash value (e.g., user device 60c may delete SAI at operation 730).

Wrap-Up

One, some, or all of the processes described with respect to FIGS. 1-9 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13, memory 63, memory 73, and/or memory 93 of FIGS. 1-1D). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from an APS subsystem to a client subsystem, from a client subsystem (e.g., a user device, a node, a repository, a third party subsystem, etc.) to an APS subsystem, and/or from one client subsystem to another client subsystem using any suitable communications protocol (e.g., the computer-readable medium may be communicated to a user device 60 as at least a portion of application 69, to a node 70 as at least a portion of application 79, to a third party subsystem 90 as at least a portion of application 93, and/or the like via any suitable communications components and/or via any suitable network(s) 50). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the terms "computer," "personal computer," "device," and "computing device" may refer to any programmable computer system that is known or that will be developed in the future. In certain embodiments, a computer will be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system," are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While there have been described systems, methods, and computer-readable media for providing an authentication processing service, many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the concepts of the disclosure can be practiced by other than the described embodiments, which are presented for purposes of illustration rather than of limitation.

What is claimed is:

1. A method for enrolling a user in a system comprising a first subsystem and a second subsystem storing a server secret, the method comprising:
    selecting, at the first subsystem, an enrollment codeword from a codeword space;
    obtaining, at the first subsystem, an enrollment template indicative of enrollment information provided by the user;
    computing, at the first subsystem, a trusted user secret based on the enrollment codeword and the enrollment template; and
    running, at the first subsystem, an instance of a two-party protocol with the second subsystem using the enrollment codeword and the server secret to generate an enrollment key;
    obtaining (522, 722), at the first subsystem, an authentication sample indicative of authentication information provided by an entity;
    computing (524, 724), at the first subsystem, an authentication codeword by decoding a decombination of the trusted user secret and the authentication sample; and
    running (525, 725), at the first subsystem, an instance (527*d*, 727*d*) of the two-party protocol with the second subsystem using the authentication codeword and the server secret to generate an authentication key.

2. The method of claim 1, further comprising protecting, at the first subsystem, sensitive data using the enrollment key.

3. The method of claim 2, further comprising storing the protected sensitive data on the first subsystem.

4. The method of claim 2, further comprising storing the protected sensitive data on a third subsystem remote from the first subsystem.

5. The method of claim 2, further comprising, after the protecting, deleting sensitive enrollment information from the first subsystem, wherein the sensitive enrollment information comprises:
the selected enrollment codeword;
the obtained enrollment template; and
the generated enrollment key.

6. The method of claim 2, further comprising, after the protecting but prior to each one of the following:
the obtaining, at the first subsystem, the authentication sample indicative of the authentication information provided by the entity;
the computing, at the first subsystem, the authentication codeword by decoding the decombination of the trusted user secret and the authentication sample; and
the running, at the first subsystem, the instance of the two-party protocol with the second subsystem using the authentication codeword and the server secret to generate the authentication key, deleting sensitive enrollment information from the first subsystem, wherein the sensitive enrollment information comprises:
the selected enrollment codeword;
the obtained enrollment template; and
the generated enrollment key.

7. The method of claim 6, further comprising:
accessing, at the first subsystem, the protected sensitive data; and
unprotecting, at the first subsystem, the protected sensitive data using the authentication key.

8. The method of claim 7, further comprising, after the unprotecting, deleting sensitive authentication information from the first subsystem, wherein the sensitive authentication information comprises:
the obtained authentication sample;
the computed authentication codeword; and
the generated authentication key.

9. The method of claim 1, further comprising:
generating, at the first subsystem, an enrollment payload based on the enrollment key;
sending, from the first subsystem to a third subsystem remote from the first subsystem, at least a first portion of the enrollment payload; and
after the sending, deleting sensitive enrollment information from the first subsystem, wherein the sensitive enrollment information comprises:
the selected enrollment codeword;
the obtained enrollment template;
the generated enrollment key; and
at least a second portion of the enrollment payload.

10. The method of claim 9, wherein the enrollment payload comprises an enrollment user keypair comprising an enrollment user public key and an enrollment user private key.

11. The method of claim 10, wherein:
the sending comprises sending, from the first subsystem to the third subsystem, the enrollment user public key of the enrollment user key pair of the enrollment payload; and
the at least a second portion of the enrollment payload comprises the enrollment user private key of the enrollment user key pair.

12. The method of claim 11, further comprising, after the deleting the sensitive enrollment information and after each one of the following:
the obtaining, at the first subsystem, the authentication sample indicative of the authentication information provided by the entity;
the computing, at the first subsystem, the authentication codeword by decoding the decombination of the trusted user secret and the authentication sample; and
the running, at the first subsystem, the instance of the two-party protocol with the second subsystem using the authentication codeword and the server secret to generate the authentication key, generating, at the first subsystem, an authentication payload based on the authentication key, wherein the authentication payload comprises an authentication user keypair comprising an authentication user public key and an authentication user private key;
sending, from the first subsystem to the third subsystem, a challenge response comprising a challenge signed by the authentication user private key of the authentication payload; and
after the sending the challenge response, deleting sensitive authentication information from the first subsystem, wherein the sensitive authentication information comprises:
the obtained authentication sample;
the computed authentication codeword;
the generated authentication key; and
at least the authentication user private key of the authentication payload.

13. The method of claim 12, further comprising, prior to the sending the challenge response, receiving, at the first subsystem from the third subsystem, the challenge.

14. The method of claim 9, wherein the enrollment payload comprises an enrollment hash value comprising the result of a hash function on the enrollment key.

15. The method of claim 14, wherein:
the sending comprises sending, from the first subsystem to the third subsystem, the enrollment hash value of the enrollment payload and the trusted user secret;
the at least a second portion of the enrollment payload comprises the enrollment hash value of the enrollment payload; and
the sensitive enrollment information further comprises the trusted user secret.

16. The method of claim 15, further comprising:
after the deleting the sensitive enrollment information and after the obtaining, at the first subsystem, the authentication sample indicative of the authentication information provided by the entity, accessing, at the first subsystem from the third subsystem, the trusted user secret and the enrollment hash value; and
after the computing, at the first subsystem, the authentication codeword by decoding the decombination of the trusted user secret and the authentication sample and after the running, at the first subsystem, the instance of the two-party protocol with the second subsystem using the authentication codeword and the server secret to generate the authentication key:
generating, at the first subsystem, an authentication payload based on the authentication key, wherein the authentication payload comprises an authentication hash value comprising the result of the hash function on the authentication key; and
comparing, at the first subsystem, the authentication hash value with the enrollment hash value.

17. The method of claim 16, further comprising selectively providing, to the entity with the first subsystem, secure access based on the comparing.

18. The method of claim 16, further comprising, after the comparing, deleting sensitive authentication information from the first subsystem, wherein the sensitive authentication information comprises:
  the obtained authentication sample;
  the computed authentication codeword;
  the generated authentication key;
  the trusted user secret;
  the enrollment hash value; and
  the authentication hash value.

19. The method of claim 9, wherein the third subsystem is remote from the second subsystem.

20. The method of claim 1, wherein the running, at the first subsystem, the instance of the two-party protocol with the second subsystem using the enrollment codeword and the server secret to generate the enrollment key occurs prior to the computing, at the first subsystem, the trusted user secret based on the enrollment codeword and the enrollment template.

21. The method of claim 1, wherein the enrollment information comprises biometrics of the user.

22. The method of claim 21, wherein the enrollment information comprises biometrics of the user.

23. The method of claim 1, wherein the enrollment key is accessible to the first subsystem but not to the second subsystem.

24. The method of claim 1, wherein the authentication information comprises biometrics of the entity.

25. A non-transitory computer-readable storage medium storing at least one program, the at least one program comprising instructions, which, when executed by at least one processor of an electronic subsystem, cause the at least one processor to:
  select an enrollment codeword from a codeword space;
  obtain an enrollment template indicative of enrollment information provided by a user;
  compute a trusted user secret based on the enrollment codeword and the enrollment template;
  run an instance of a two-party protocol with another electronic subsystem using the enrollment codeword and a secret of the other electronic subsystem to generate an enrollment key;
  obtain an authentication sample indicative of authentication information provided by an entity;
  compute an authentication codeword by decoding a decombination of the trusted user secret and the authentication sample; and
  run an instance of the two-party protocol with the other electronic subsystem using the authentication codeword and the secret of the other electronic subsystem to generate an authentication key.

26. A user electronic device comprising:
  a memory component;
  a communications component; and
  a processor coupled to the memory component and the communications component, the processor configured to:
    select an enrollment codeword from a codeword space;
    obtain an enrollment template indicative of enrollment information provided by a user;
    compute a trusted user secret based on the enrollment codeword and the enrollment template;
    run, via the communications component, an instance of a two-party protocol with another electronic device using the enrollment codeword and a secret of the other electronic device to generate an enrollment key;
    obtain an authentication sample indicative of authentication information provided by an entity;
    compute an authentication codeword by decoding a decombination of the trusted user secret and the authentication sample; and
    run an instance of the two-party protocol with the other electronic device using the authentication codeword and the secret of the other electronic device to generate an authentication key.

* * * * *